(12) United States Patent
Miyashita

(10) Patent No.: US 10,877,702 B2
(45) Date of Patent: Dec. 29, 2020

(54) PRINTER AND MEDIUM STORING PROGRAMS EXECUTABLE BY OPERATION TERMINAL

(71) Applicant: BROTHER KOGYO KABUSHIKI KAISHA, Aichi-ken (JP)

(72) Inventor: Tomoki Miyashita, Aichi-ken (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/362,601

(22) Filed: Mar. 22, 2019

(65) Prior Publication Data

US 2019/0369926 A1 Dec. 5, 2019

(30) Foreign Application Priority Data

Jun. 1, 2018 (JP) .................. 2018-106128

(51) Int. Cl.
*G06F 3/12* (2006.01)
*H04N 1/00* (2006.01)
*G06K 1/00* (2006.01)
*G06K 15/02* (2006.01)
*G01G 19/415* (2006.01)

(52) U.S. Cl.
CPC ......... *G06F 3/1205* (2013.01); *G01G 19/415* (2013.01); *G06F 3/1243* (2013.01); *G06F 3/1292* (2013.01); *G06K 15/1805* (2013.01); *G06K 15/1817* (2013.01); *H04N 1/00323* (2013.01)

(58) Field of Classification Search
CPC .... G06F 3/1205; G06F 3/1243; G06F 3/1292; G01G 19/415; G01G 23/18; G06K 15/1805; G06K 15/1817; H04N 1/00323; H04L 67/1044; G06Q 20/208
See application file for complete search history.

(56) References Cited

U.S. PATENT DOCUMENTS 3,851,720 A * 12/1974 Williams, Jr. ......... G01G 23/42
177/3
2020/0056929 A1* 2/2020 Kempf ............... G01G 23/3721

FOREIGN PATENT DOCUMENTS

JP     H09-58644 A      3/1997
JP     2004-208846 A    7/2004

* cited by examiner

*Primary Examiner* — Iriana Cruz
(74) *Attorney, Agent, or Firm* — Kenealy Vaidya LLP

(57) ABSTRACT

A printer communicates with an operation terminal and a weight measuring apparatus. The printer includes a receiving buffer configured to store data, a memory in which an identification information list for the weight measuring apparatus is stored, and a controller. The printer has a weight measuring mode for transferring the data received via a specific interface, to which the weight measuring apparatus is connected, to the operation terminal, and an ordinary mode for executing a command analysis after developing, in the receiving buffer, the data received via all interfaces including the specific interface. The controller is configured to: identify an external device based on identification information of the external device connected to the printer, determine whether the identification information is included in the identification information list, and let the operation mode be the weight measuring mode based on determining that the identification information is included in the identification information list.

17 Claims, 17 Drawing Sheets

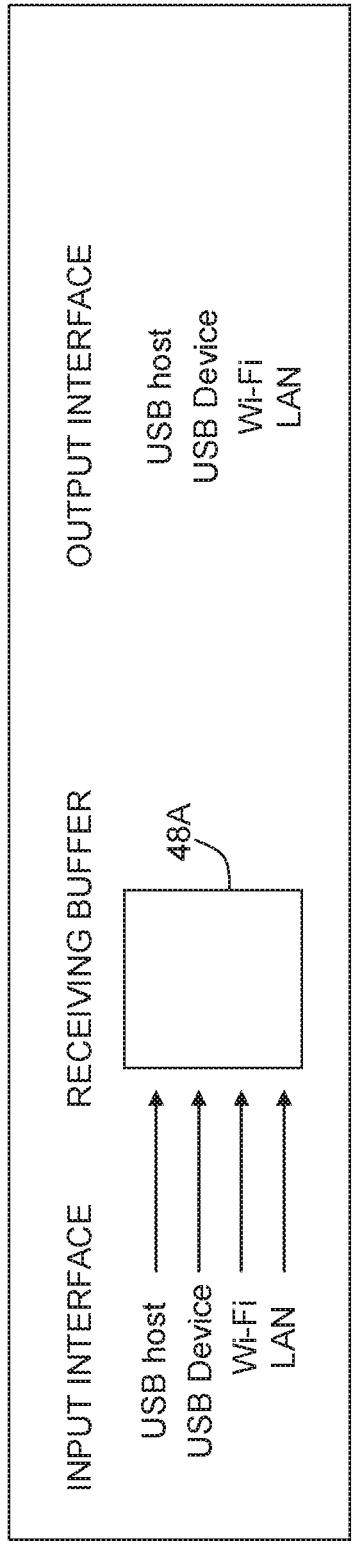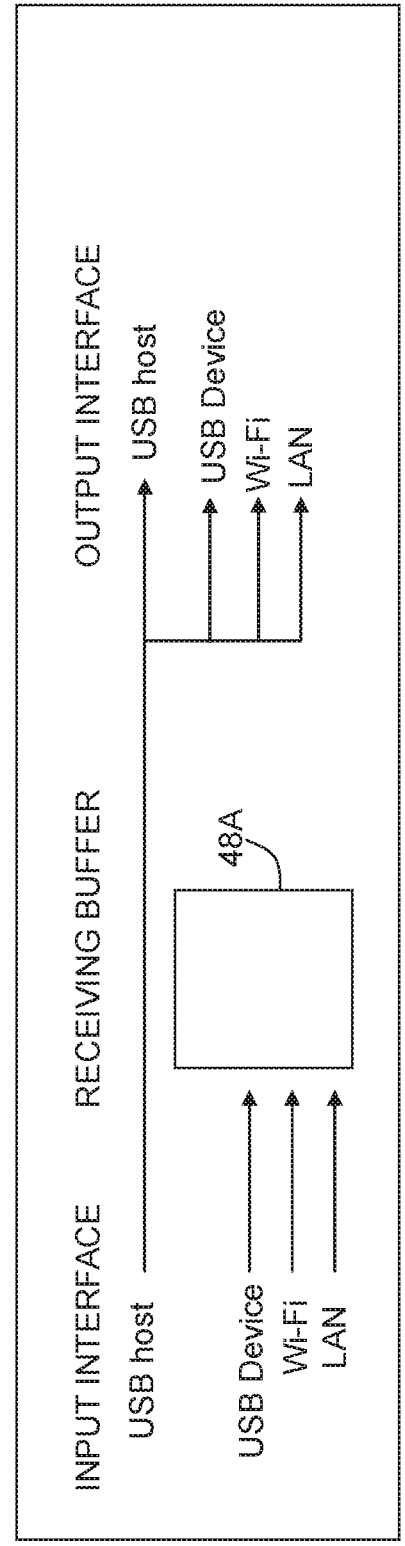

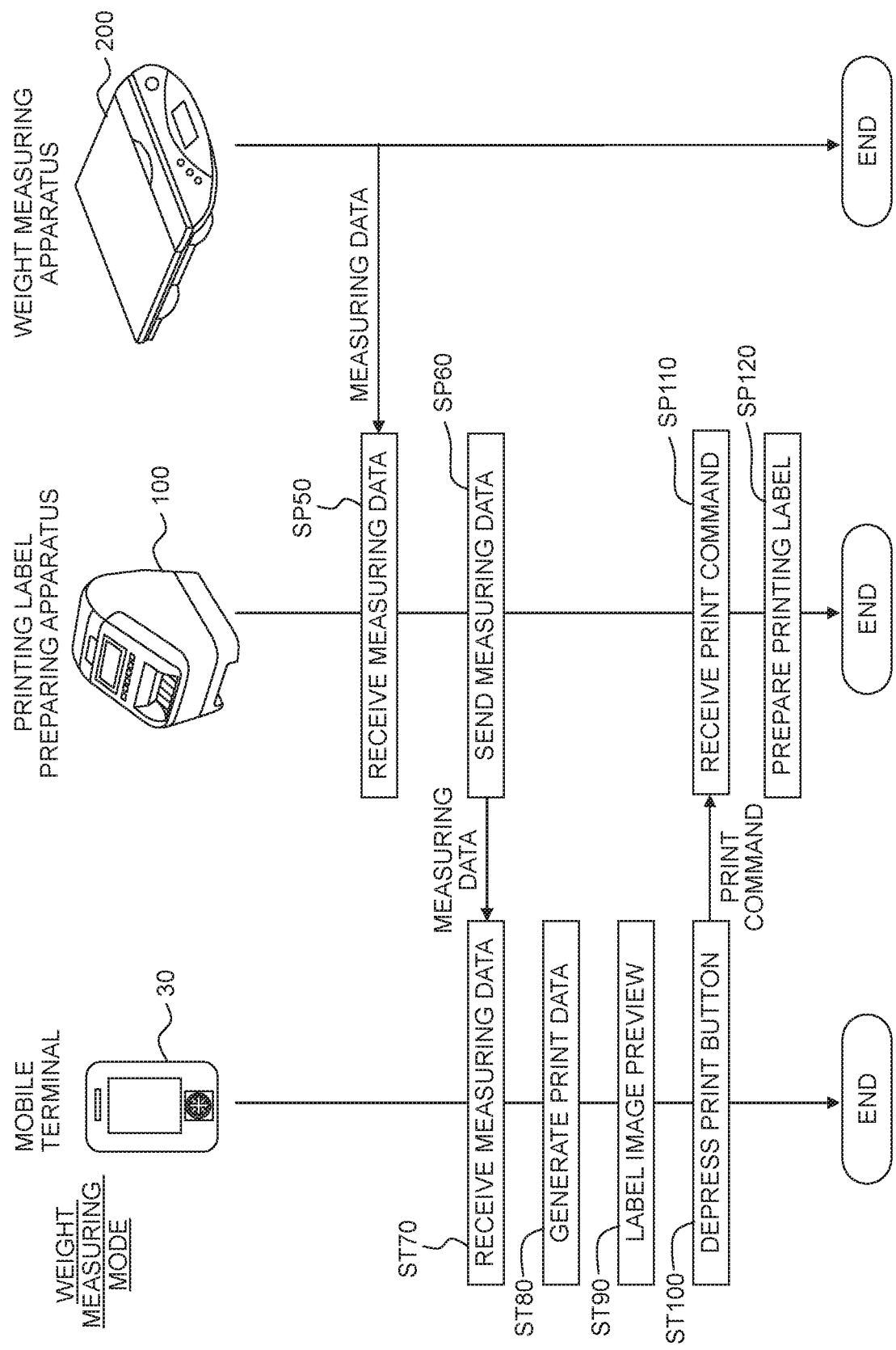

Fig. 9

| | VENDOR ID | PRODUCT ID |
|---|---|---|
| 1 | 04F9 | 2042 |
| 2 | 04F9 | 3233 |
| 3 | 04F9 | 1623 |
| 4 | 0855 | 4255 |
| 5 | 0855 | 2236 |
| ... | ... | ... |

47A

PRINTER AND MEDIUM STORING PROGRAMS EXECUTABLE BY OPERATION TERMINAL

CROSS REFERENCE TO RELATED APPLICATION

The present application claims priority from Japanese Patent Application No. 2018-106128 filed on Jun. 1, 2018, the disclosures of which is incorporated herein by reference in its entirety.

BACKGROUND

Field of the Invention

The present invention relates to a printer connectable to a weight measuring apparatus, and a medium storing programs executable by an operation terminal to be connected to the printer.

Description of the Related Art

There is a known configuration in which a printer is connected to a weight measuring apparatus to be used for measuring the weight of a measurement object (see Japanese Patent Application Laid-open No. H9-58644, for example). With this conventional technique, the weight measuring apparatus (a weighing apparatus) and the printer (a label printer) are connected through a communication cable. If the weight of a measuring object (an item) is measured with the weight measuring apparatus, then a measuring data (a weighing data) thereof is inputted from a communication port of the printer, and a label is issued on which the contents of the data are printed.

SUMMARY

However, with the above conventional technique, the printer is prepared in advance as a dedicated device for the above weight measuring apparatus, and used while being integrally connected with the weight measuring apparatus. Therefore, it is not possible to use the printer for general purposes except for weight measurement with the weight measuring apparatus.

Further, when it is configured to be usable for a case of measuring weight of a measurement object with the weight measuring apparatus connected and a case of ordinary printing with an operation terminal connected, inappropriate operations may be done for the received data if it is not known whether the connected external device is a weight measuring apparatus or an operation terminal.

An object of the present teaching is to provide a printer which can prevent inappropriate operations with respect to data received from a connected external device, and which can be generally used for a general purposes other than the weight measurement with a weight measuring apparatus, and to provide a medium storing processing programs to be executed by an operation terminal connected to the printer.

According to a first aspect of the present teaching, there is provided a printer configured to communicate with an operation terminal and a weight measuring apparatus configured to transmit a measuring data of weight of a measuring object, the printer comprising: a receiving buffer configured to store data; a memory in which an identification information list for the weight measuring apparatus is stored; and a controller, wherein the printer has, as an operation mode, a weight measuring mode for transferring the data received via a specific interface, to which the weight measuring apparatus is connected, to the operation terminal, and an ordinary mode for executing a command analysis after developing, in the receiving buffer, the data received via all interfaces including the specific interface, and wherein the controller is configured to execute: an identification processing of identifying an external device based on identification information of the external device connected to the printer; a list determination processing of determining whether the identification information used for the identification processing is included in the identification information list stored in the memory; and a first mode switch processing of letting the operation mode be the weight measuring mode based on determining that the identification information is included in the identification information list in the list determination processing.

The printer according to the first aspect is configured to communicate with both of an operation terminal and a weight measuring apparatus (connected to a specific interface) to execute printing corresponding to a weight measuring result from the weight measuring apparatus, based on a user's operation on the operation terminal. Further, this printer includes a receiving buffer in which received data is stored, and the printer is also usable for other purposes than weight measuring with the weight measuring apparatus by using the receiving buffer.

Therefore, in the printer according to the first aspect, two operation modes are provided as an operation mode: the weight measuring mode for transferring the data received via the specific interface to the operation terminal (for example, without developing the received data in the receiving buffer, or after developing the received data in a dedicated buffer other than the receiving buffer), and an ordinary mode for executing a command analysis after developing the data received via all interfaces in the receiving buffer. Those two operation modes are appropriately switched for execution.

That is, if any external device is connected to the printer, then the controller identifies the external device in the identification processing based on the identification information for the external device connected. The memory of the printer stores the identification information list of weight measuring apparatuses and, in the identification information list, the identification information of the weight measuring apparatus is registered in advance.

In the list determination processing to be executed after the identification processing, it is determined whether the identification information used for identification is included in the identification information list. If the identification information is included in the identification information list, then the operation mode of the printer is switched to the weight measuring mode in the first mode switch processing.

As described above, in the printer according to the first aspect, even if any external device is connected, it is still possible to automatically switch the operation mode to the weight measuring mode as long as the identification information is registered in the identification information list. By virtue of this, differently from conventional configurations in which the printer as a dedicated device is used while being integrally connected to a weight measuring apparatus, the printer can be used for general printing purposes other than printing weight measured by the weight measuring apparatus. Especially, in the weight measuring mode, for example, without developing the received data in the receiving buffer, it is possible to reliably prevent from mistakenly performing command analysis and inappropriate operation with respect to the data in the receiving buffer.

Further, according to the first aspect, it is not necessary to perform any tangled setting and the like for switching the modes. Therefore, because it is sufficient to simply connect an eternal device to the printer, the labor burden on the user will not increase.

According to a second aspect of the present teaching, there is provided a non-transitory computer-readable medium storing programs executable by a processor of an operation terminal which is connectable to a printer, the printer being connectable to a weight measuring apparatus which is configured to output weight data of a measurement object, the printer having a weight measuring mode in which received data is transmitted to the operation terminal and a normal mode in which command analysis is executed with respect to the received data, the programs, when executed by the processor, causing the operation terminal to: receive, from the printer, an inquiry request about whether identification information of an external device connected to the printer is included in a weight measuring apparatus list in an external server; inquire whether the identification information is included in the weight measuring apparatus list by transmitting, to the external server, the identification information related to the inquiry request received; and transmit an answer, to the printer, that the identification information is included or not included in the weight measuring apparatus list, based on the result of the inquiry.

According to the first aspect and the second aspect of the present teaching, it is possible to use the printer for general-purposes other than the weight measurement with a weight measuring apparatus, and to prevent inappropriate operations for data received from an external device connected.

BRIEF DESCRIPTION OF THE DRAWINGS

FIGS. 4A and 4B are illustrative views for explaining an input/processing aspect of a received data in each of an ordinary mode and a weight measuring mode.

FIG. 5 is a sequence (time chart) depicting a processing procedure carried out in the mobile terminal, the printing label preparing apparatus, and the weight measuring apparatus.

FIG. 9 is an illustrative view depicting an example of an identification information list stored in a flash memory.

DESCRIPTION OF THE EMBODIMENT

Hereinbelow, referring to the accompanying drawings, an embodiment of the present teaching will be explained.

<Outline of the System>

Figure 1:
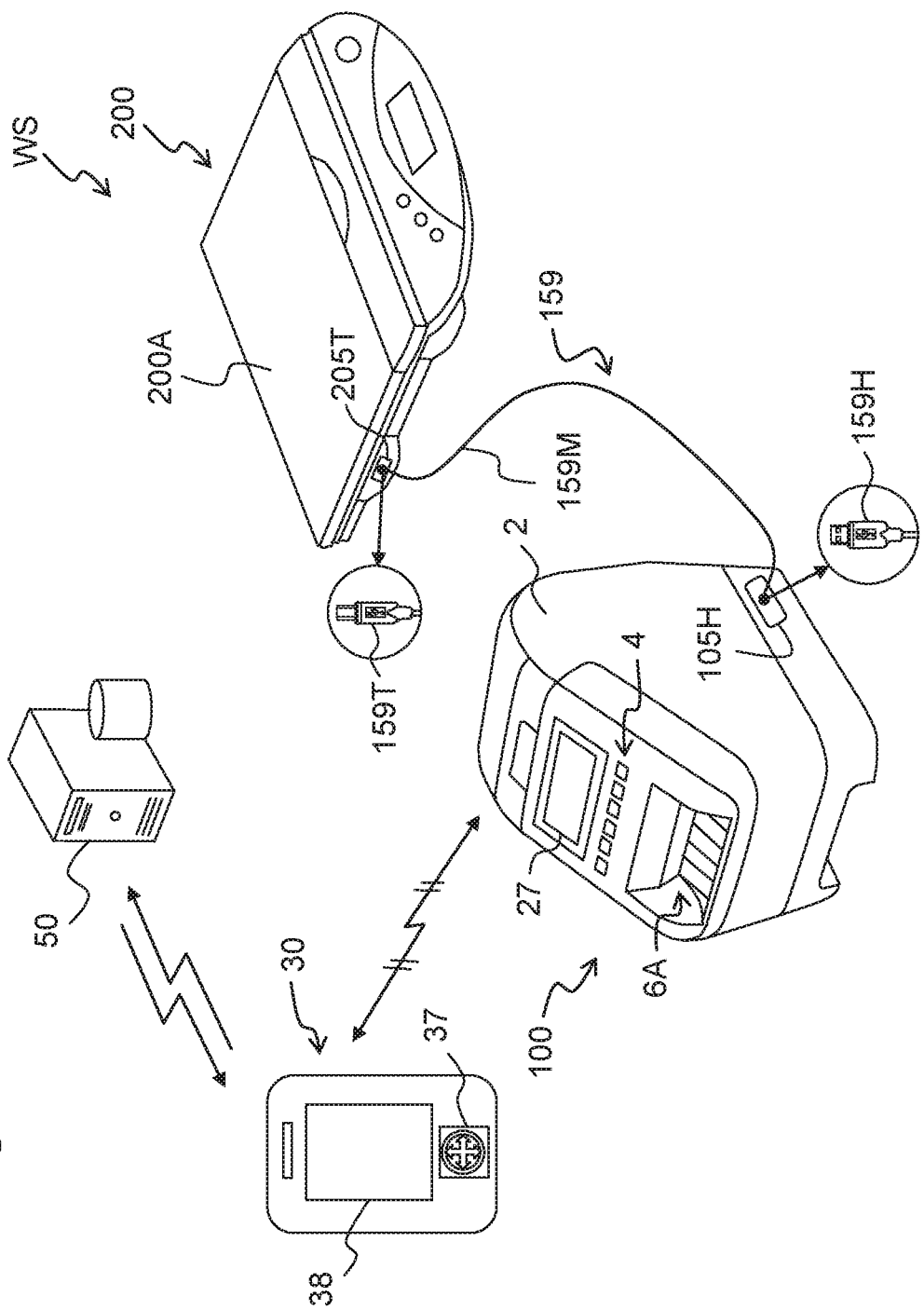
FIG. 1 is a schematic configuration diagram depicting a weighing system according to an embodiment of the present teaching.

As depicted in FIG. 1, a weighing system WS includes a printing label preparing apparatus 100 as a printer, a mobile terminal 30 (corresponding to an example of operation terminal), a server 50 (corresponding to an example of external server), and a weight measuring apparatus 200 (a weighing apparatus). The printing label preparing apparatus 100 and the weight measuring apparatus 200 are connected with a USB cable 159 in an information transmittable and receivable manner (the details thereof will be described later on). Further, the printing label preparing apparatus 100 and the mobile terminal 30 are connected in an information transmittable and receivable manner by an appropriate wireless communication such as Wi-Fi (trademark), Bluetooth (trademark), another wireless LAN, or the like (the details thereof will be described later on). Further, the server 50 and the mobile terminal 30 are also connected in an information transmittable and receivable manner by an appropriate wireless communication.

The mobile terminal 30 is an information terminal such as, for example, a PDA (Portable Digital Assistant), a smartphone (a cellphone provided with a PDA function), or the like. The mobile terminal 30 has a display 38 such as a liquid crystal display or the like, and an operation part 37 made from, for example, a keyboard, a mouse, buttons, and the like. The mobile terminal 30 is capable of sending instruction signals to the printing label preparing apparatus 100 via the aforementioned wireless communication (the details thereof will be described later on).

The printing label preparing apparatus 100 includes a main body casing 2. The main body casing 2 is formed at the front side with a discharge port 6A to discharge a printed tape for label-print 20A to the outside (see aftermentioned FIG. 3). A liquid crystal display 27 (LCD) and a key input part 4 (corresponding to an example of operation means) are arranged on a front surface portion of the main body casing 2 above the discharge port 6A. The liquid crystal display 27 displays various screens and the like under the control of an aftermentioned CPU 44. The key input part 4 includes a plurality of keys (six in this embodiment). Further, the main body casing 2 is provided with a socket for host 105H.

The weight measuring apparatus 200 includes a platform 200A to place a measuring object whose weight is to be measured, and a socket for target 205T.

The USB cable 159 includes a first connector 159H causing a connecting device to function as a host (device), a second connector 159T causing another connecting device to function as a target (device), and a cable 159M provided between the first connector 159H and the second connector 159T, respectively. In this embodiment, in the USB cable 159, the first connector 159H is fitted (connected) to the socket for host 105H of the printing label preparing apparatus 100 while the second connector 159T is fitted to the socket for target 205T of the printing label preparing apparatus 100. Therefore, to explain about a functional relation between the printing label preparing apparatus 100 and the weight measuring apparatus 200, the printing label preparing apparatus 100 functions as the host device while the weight measuring apparatus 200 functions as the target device.

<Electrical Configuration of the Mobile Terminal and the Server>

Figure 2:
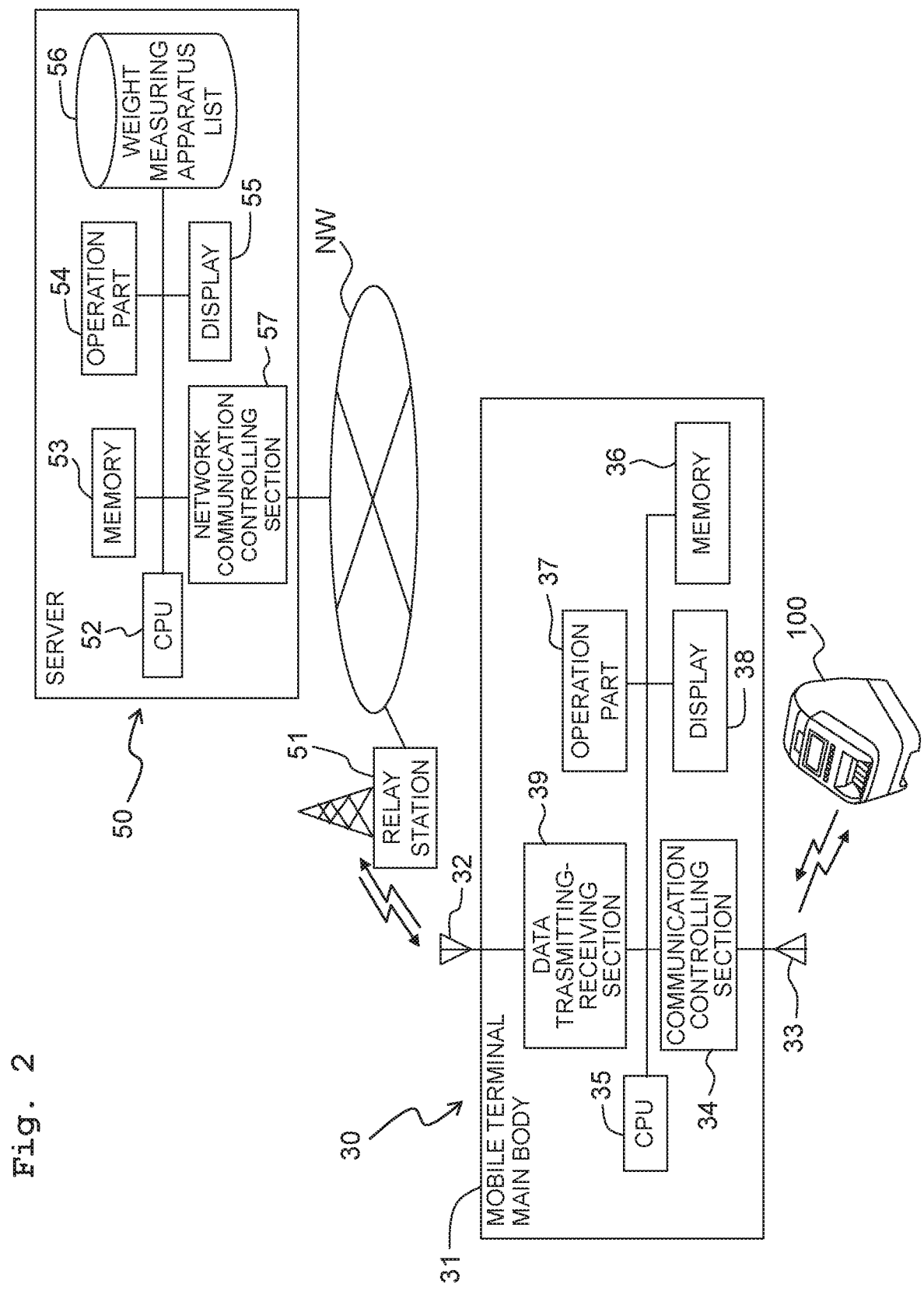
FIG. 2 is a functional block diagram depicting an electrical configuration of a server and a mobile terminal.

FIG. 2 will be used for an explanation of an electrical configuration of the mobile terminal 30 and the server 50.

In FIG. 2, according to this embodiment, the server 50 is connected to a relay station 51 carrying out wireless communication with the mobile terminal 30 via a network NW. In correspondence with that, the mobile terminal 30 includes a mobile terminal main body 31, a first antenna 32 for carrying out the wireless communication with the network NW via the relay station 51, and a second antenna 33 for carrying out the abovementioned wireless communication with the printing label preparing apparatus 100.

The mobile terminal main body 31 includes: a CPU 35 as a computation means, a memory 36 made from ROM, RAM, and/or the like storing print processing programs related to an aftermentioned sequence execution depicted in FIG. 5, the aforementioned operation part 37 to which instructions and information are inputted from a user, the aforementioned display 38 displaying various kinds of information and message, a data transmitting-receiving section 39 transmitting and receiving various data and signals to and from the relay station 51 via the first antenna 32, and a communication controlling section 34 carrying out the aforementioned wireless communication with the printing label preparing apparatus 100 via the second antenna 33.

The server 50 includes, in this embodiment, a CPU 52, a memory 53 made from, for example, RAM, ROM, and the like, an operation part 54, a display 55, a large capacity storage device 56, and a network communication controlling section 57 for controlling the communication of information signals to and from the mobile terminal 30 via the network NW and the relay station 51. Note that a weight measuring apparatus list stored in the large capacity storage device 56 will be described later on.

<Printing Label Preparing Apparatus 100>

Figure 3:
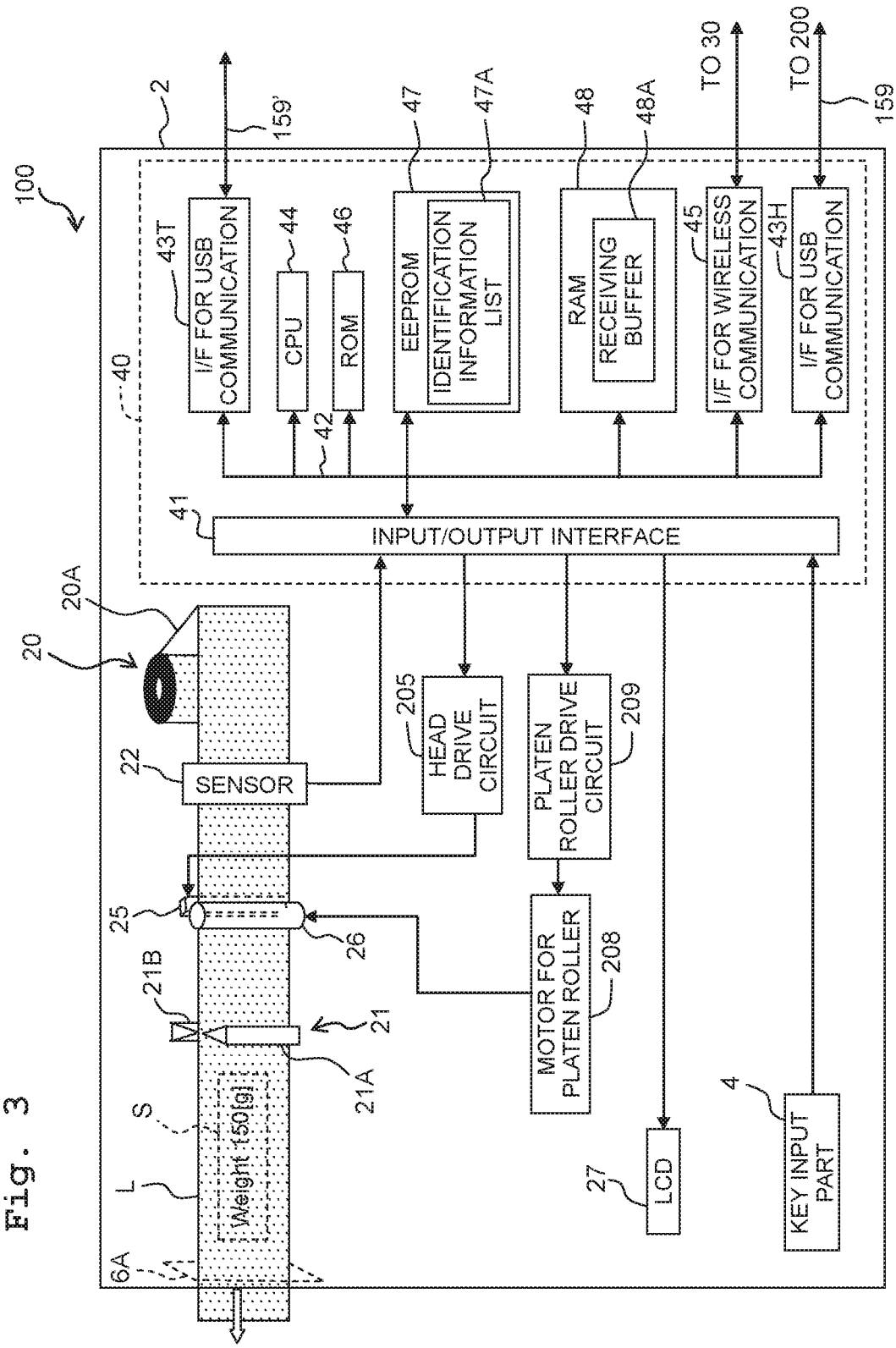
FIG. 3 is a functional block diagram depicting a detailed configuration of a printing label preparing apparatus.

Next, FIG. 3 will be used for explaining a detailed configuration of the printing label preparing apparatus 100.

In FIG. 3, the main body casing 2 accommodates a tape roll for label-print 20 on which the tape for label-print 20A of a predetermined width (corresponding to an example of the printing medium) is rolled. The tape for label-print 20A is constructed from an elongate self-chromogenic thermosensitive sheet (a so-called thermo-paper), and a release paper on which one side of the thermosensitive sheet is attached via an adhesive. The tape roll for label-print 20 is, for example, accommodated in a cartridge and, in the main body casing 2, a cartridge holder (not depicted) is provided to removably hold the cartridge. Note that without using the cartridge as described above, the tape roll for label-print 20 may be directly accommodated in the main body casing 2. Then, the tape roll for label-print 20 may be configured to reel out the tape for label-print 20A while the tape roll for label-print 20 is being rotated in the main body casing 2.

The tape for label-print 20A is reeled out from the tape roll for label-print 20 and conveyed by a platen roller 26 (corresponding to an example of the conveyance means). The platen roller 26 is driven by a motor for platen roller 208 whereby the tape for label-print 20A is reeled out from the tape roll for label-print 20 while being conveyed. A platen roller drive circuit 209 controls the motor for platen roller 208.

The tape for label-print 20A to be conveyed is nipped between a thermal head 25 (corresponding to an example of the printing means) and the platen roller 26, and led to the discharge port 6A. Note that if the tape for label-print 20A is provided with an appropriate identification mark, then a sensor 22 will detect the mark and output a corresponding detection signal.

The thermal head 25 includes a plurality of heater elements along a direction orthogonal to a conveyance direction for the tape for label-print 20A. The platen roller 26 is arranged on the side facing the surface provided with the heater elements of the thermal head 25. The heater elements are powered according to a dot pattern data for printing and, thereby, desirable text characters and the like are printed in a print area S of the tape for label-print 20A passing through between the thermal head 25 and the platen roller 26. A head drive circuit 205 controls the drive (powering control) of the respective heater elements provided on the thermal head 25.

A cutter unit 21 is arranged at the inner side of the discharge port 6A, including a movable blade 21A and a fixed blade 21B. The tape for label-print 20A printed by the thermal head 25 is cut up along a width direction orthogonal to the tape conveyance direction to become a printed label L of a predetermined length and then discharged from the discharge port 6A, by way of such a reciprocation of the movable blade 21A on a predetermined time schedule as caused by an actuator (not depicted) such as a motor, a solenoid, or the like for the cutting. Note that manual cutting may also be adopted for the user to manually reciprocate the movable blade 21A for the cutting, without using an automatic cutting operation with the driving force of such kind of actuator. Alternatively, the cutting may also be carried out by way of displaying on the liquid crystal display 27 or the like that the tape for label-print 20A has been conveyed to reach a predetermined cutting position, such that the user, who has seen that display, manipulates a predetermined cutting button of the key input part 4 to cause the actuator to move the movable blade 21A.

Further, in FIG. 3, a control circuit 40 is arranged on a control board (not depicted) in the main body casing 2.

The control circuit 40 is provided with the CPU 44 (corresponding to an example of the control means) and, via a data bus 42, the CPU 44 is connected with an input/output interface 41, a ROM 46, a flash memory 47 (EEPROM, corresponding to an example of the storage means), a RAM 48, interfaces for USB communication 43T and 43H, and an interface for wireless communication 45.

The input/output interface 41 is connected to the head drive circuit 205, the platen roller drive circuit 209, the liquid crystal display 27, and the key input part 4.

The interface for USB communication 43H (corresponding to an example of the specific interface) carries out information communication (for example, serial communication or the like) with the weight measuring apparatus 200 as the target device, via the socket for host 105H by using the USB cable 159. Further, the interface for wireless communication 45 carries out the aforementioned wireless communication with the second antenna 33 of the mobile terminal 30. Note that although without a detailed explanation, the interface for USB communication 43T can carry out information communication with the host device via a USB cable 159', through a socket for target.

The RAM 48 temporally stores various computation results computed by the CPU 44. The RAM 48 is provided with a receiving buffer 48A for expanding or developing and keeping the data received from the mobile terminal 30 and/or the weight measuring apparatus 200, a work memory (not depicted) for storing various computation data, and the like.

The ROM 46 stores various programs needed for control such as a control program for reading out, for example, a print data developed in the receiving buffer 48A to drive the thermal head 25 and/or the motor for platen roller 208, a control program for carrying out the sequence depicted in FIG. 5, and the like.

The CPU 44 carries out a processing according to the programs stored beforehand in the ROM 46 while using the temporal storage function of the RAM 48, so as to control the overall operation of the printing label preparing apparatus 100.

Note that an identification information list 47A stored in the flash memory 47 will be described later on.

<First Characteristic of the Embodiment>

The printing label preparing apparatus 100 of the above basic configuration according to this embodiment lies in the aspect that it is possible to have a general-purpose usage for both of printing a weight measuring result through connection with the weight measuring apparatus 200 (the detail thereof will be described later on), and an ordinary printing (such as printing a label or the like) by using the print data from the mobile terminal 30 for example. That is, the printing label preparing apparatus 100 is configured to be capable of information communication with both the weight measuring apparatus 200 and the mobile terminal 30 and, meanwhile, to be switchable between two operation modes, i.e., the weight measuring mode for printing the weight measuring result and the ordinary mode for the ordinary printing.

Those two modes are different in the flow of the various data received in the printing label preparing apparatus 100 from an external device(s), and inputted from the input interface.

As depicted in FIG. 4A, in the ordinary mode, the received data are inputted to the receiving buffer 48A of the aforementioned RAM 48 and developed, the received data being inputted via the respective interfaces, that is, all of the input interfaces, i.e., the interface for USB communication 43H for functioning as the host device (simplified in the figure as "USB host"), the interface for USB communication 43T for functioning as the target device (simplified in the figure as "USB device"), and the interface for wireless communication 45 (simplified in the figure as "Wi-Fi", "LAN"). Then, the data developed in the receiving buffer 48A undergoes a command analysis by a publicly known method to generate a print data for printing the corresponding characters on the tape for label-print 20A by using the thermal head 25.

On the other hand, As depicted in FIG. 4B, in the weight measuring mode, the received data are inputted to the receiving buffer 48A and developed, the received data being inputted via the interface for USB communication 43T (simplified in the figure as "USB device") and the interface for wireless communication 45 (simplified in the figure as "Wi-Fi", "LAN"). However, to the interface for USB communication 43H (simplified in the figure as "USB host"), the received data is not inputted via the receiving buffer 48A but is outputted from any of the output interfaces, i.e., the interface for USB communication 43H ("USB host") or the interface for USB communication 43T ("USB device") or the interface for wireless communication 45 ("Wi-Fi", "LAN"), and transferred as it is.

Note that the CPU 44 has a function to switch the input and output processes for such data as described above, by a software method for example.

<Weight Measuring Mode>

As described earlier on, in the weight measuring mode, based on the user's operation on the mobile terminal 30, printing is carried out for a weight measuring result from the weight measuring apparatus 200. FIG. 5 is used for explanation of a processing flow in the weight measuring mode.

FIG. 5 is a sequence (time chart) depicting a processing procedure carried out by the mobile terminal 30, the printing label preparing apparatus 100, and the weight measuring apparatus 200. Note that as already described, the procedure carried out by the mobile terminal 30 is a processing carried out by the CPU 35 on the basis of the print processing programs stored in the ROM of the memory 36. The procedure carried out by the printing label preparing apparatus 100 is a processing carried out by the CPU 44 on the basis of the control program stored in the ROM 46.

As depicted in FIG. 5, after the power is on, the weight measuring apparatus 200 sends, for example, the measuring data showing the weight measuring result of a measuring object laid on the platform 200A to the printing label preparing apparatus 100 repetitively at a predetermined frequency. The printing label preparing apparatus 100 receives the measuring data sent from the weight measuring apparatus 200 via the interface for USB communication 43H (step SP50). As a result, the printing label preparing apparatus 100 transfers the measuring data received in the step SP50 to the mobile terminal 30 as it is, without inputting to and developing in the receiving buffer 48A (step SP60).

The mobile terminal 30 receives the measuring data transferred from the printing label preparing apparatus 100 in the above manner (step ST70). Thereafter, the mobile terminal 30 generates a print data for preparing a printing label showing the weight measuring result of the measuring object in the weight measuring apparatus 200, included in the received measuring data (step ST80). Then, such a display signal is outputted to the display 38 as corresponding to a label image showing an outlook of the printed label L based on the generated print data to preview the image of the label (step ST90).

Then, if the user presses a print button (not depicted) provided in the operation part 37 of the mobile terminal 30, then the mobile terminal 30 outputs a print command to instruct the preparation of the printed label L corresponding to measuring data to the printing label preparing apparatus 100 (step ST100). Note that the print command is generated by the CPU 35, including the print data generated in the step ST80.

The printing label preparing apparatus 100 receives the outputted print command (step SP110). Then, with the print command received, the printing label preparing apparatus 100 develops the print data included in the print command into the receiving buffer 48A of the RAM 48. Then based on the developed data, the thermal head 25, the platen roller 26 and the like are controlled via the head drive circuit 205 and the platen roller drive circuit 209 by a publicly known method, to carry out the corresponding print on the tape for label-print 20A. By virtue of this, the printed label L is prepared (step SP120).

<An Example of the Printed Label Showing a Weight Measuring Result>

Figure 6:
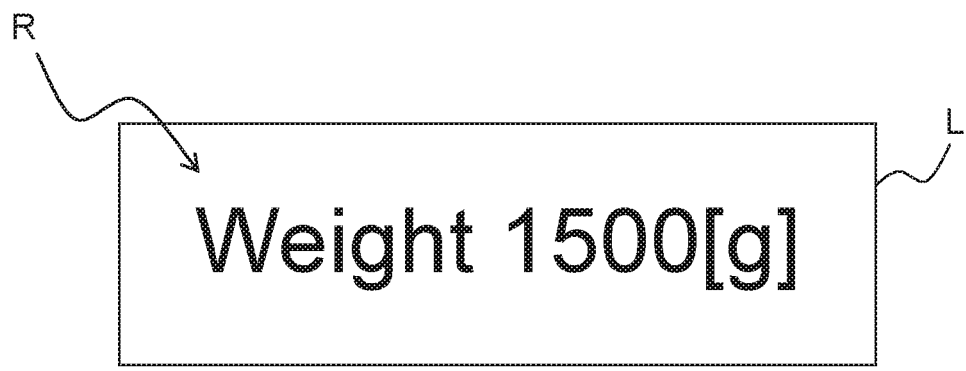
FIG. 6 is a plan view depicting an example of a printing label to be prepared.

FIG. 6 depicts an example of the printed label L prepared in the above manner according to the weight measuring mode. In this embodiment, the measuring object is weighed 1,500 grams on the platform 200A of the weight measuring apparatus 200 and, therefore, the text characters "Weight 1500 [g]" are printed as printed words R on the printed label L to show the result of measuring the weight.

<Second Characteristic of the Embodiment>

On the other hand, if the printing label preparing apparatus 100 is provided with the weight measuring mode and the ordinary measuring mode as described earlier on, then inappropriate operations are liable to happen mistakenly for the received data when it is not possible to identify whether or not the external device newly connected to the interface for USB communication 43H is the weight measuring apparatus 200. In this embodiment, as another characteristic, in order to prevent inappropriate operations from happening to the received data, the CPU 44 identifies the connected external device. Hereinbelow, an explanation will be made about a detailed control procedure including the identification processing, following the order as depicted in FIGS. 7 to 16 and the like. Note that the control procedure is carried out by the CPU 44 of the printing label preparing apparatus 100.

<First Main Flow>

Figure 7:
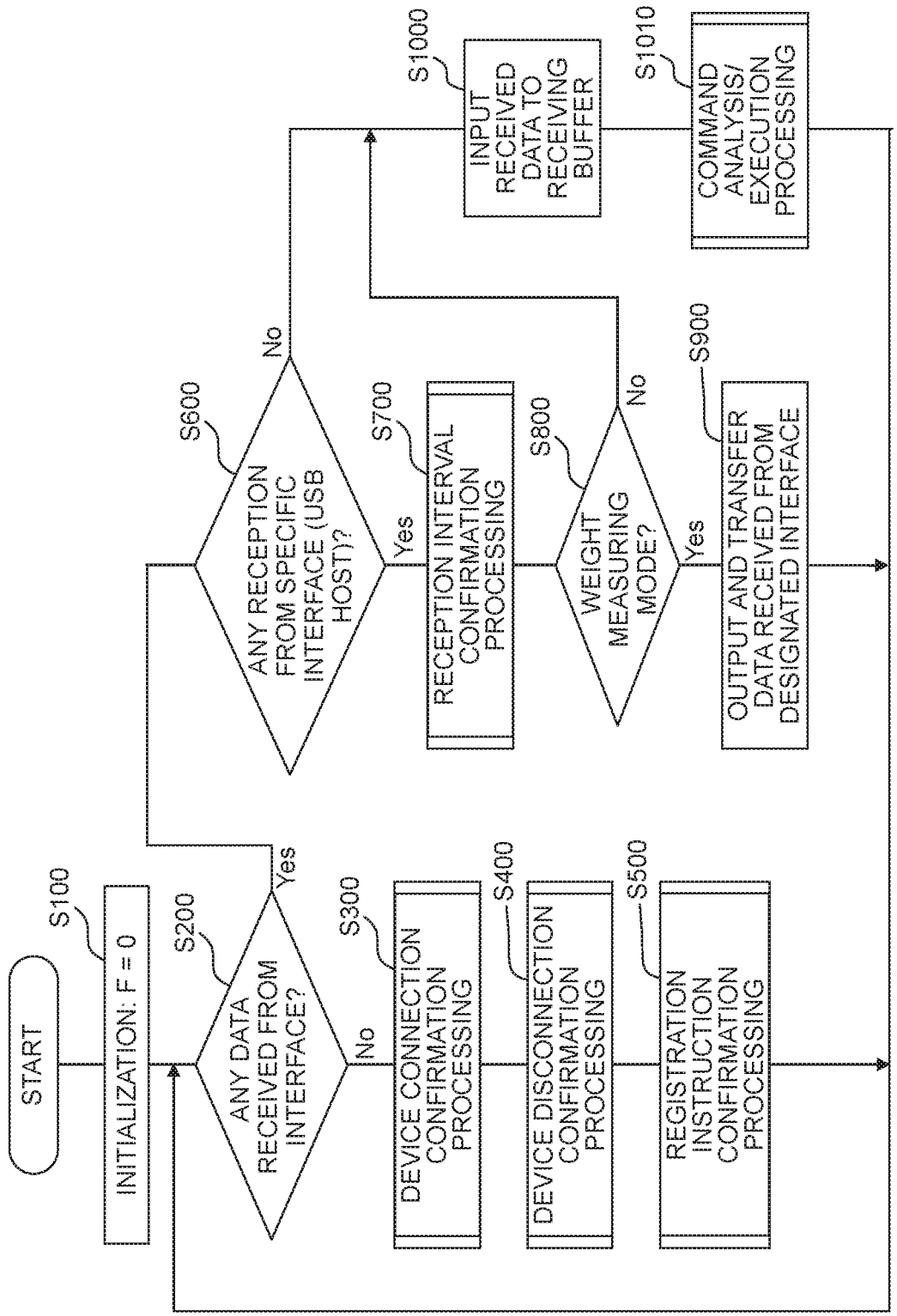
FIG. 7 is a flow chart depicting a processing procedure carried out by the CPU of the printing label preparing apparatus.

In the flow depicted in FIG. 7, first in the step S100, the CPU 44 of the printing label preparing apparatus 100 initializes every unit in the printing label preparing apparatus 100 and, meanwhile, initializes such a mode flag to zero as indicating that the operation mode is the weight measuring mode.

Then, in the step S200, the CPU 44 determines whether or not any data is received from some external device via any of the interfaces described earlier on. If a data is received (S200: Yes), then the processing is turned to an aftermentioned step S600. If no data is received (S200: No), then the processing is turned to a step S300. Note that the processing carried out in the step S200 corresponds to an example of the data determination processing set forth in each of the appended claims. In the step S300, the CPU 44 carries out a connecting confirmation processing for the external device.

<First External Device Connecting Confirmation Processing>

Figure 8:
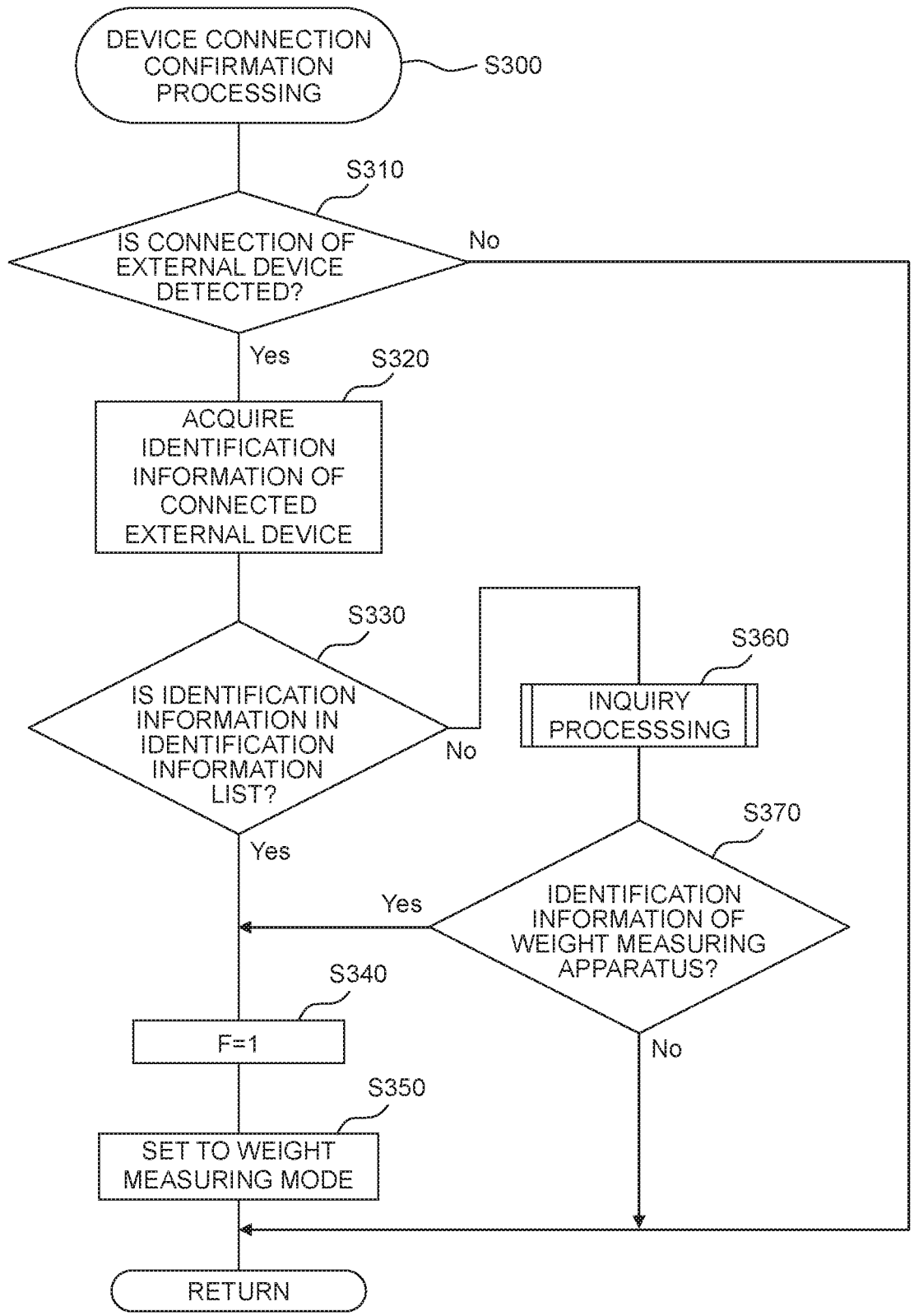
FIG. 8 is a flow chart depicting a detailed procedure of a connecting confirmation processing for an external device.

FIG. 8 depicts a detailed procedure of the connecting confirmation processing for the external device in the step S300.

In FIG. 8, first, in a step S310, the CPU 44 determines whether or not connection of any external device is detected by a publicly known method. If no connection of any external device is detected (S310: No), then the present routine is ended and the processing is turned to a step S400 in an aftermentioned flow of FIG. 7. If connection of an external device is detected (S310: Yes), then the processing is turned to a step S320. Note that the step S310 corresponds to an example of the connecting determination processing.

In the step S320, the CPU 44 acquires identification information for the connected external device (for example, the vendor ID issued by each business institution or company, the product ID which is the unique code assigned by the business institution or company holding the vendor ID to each product or device model, by a publicly known method (such as acquiring the communication contents in Plug & Play communication, for example), so as to identify that external device. Note that the step S320 corresponds to an example of the identification processing.

Then, in a step S330, the CPU 44 determines whether or not the identification information acquired in the step S320 is included in the identification information list 47A described earlier on. That is, the identification information list 47A is written into and stored (registered) in the flash memory 47 in advance at an appropriate time, for example, before or after the printing label preparing apparatus 100 is manufactured. Note that the identification information list 47A may be written by way of an appropriate operation on the printing label preparing apparatus 100 as in the above manner or written with what is acquired from the mobile terminal 30 and/or the external server 50 via wireless communication or the like.

FIG. 9 depicts an example of the identification information list 47A. As depicted in FIG. 9, for example, the first item of the list is registered with the weight measuring apparatus of the vendor ID "04F9" and the vendor ID "2042"; the second item is registered with the weight measuring apparatus of the vendor ID "04F9" and the vendor ID "3233"; and the third item is registered with the weight measuring apparatus of the vendor ID "04F9" and the vendor ID "1623". The forth item of the list is registered with the weight measuring apparatus of the vendor ID "0855" and the vendor ID "2236"; (illustration and explanation are omitted for the following items).

In the step S330 depicted in FIG. 8, it is determined whether or not the identification information acquired in the step S320 is registered (recorded) in the identification information list 47A. If the acquired identification information is not included in the identification information list 47A (S330: No), then the processing is turned to an aftermentioned step S360. If the acquired identification information is included in the identification information list 47A (S330: Yes), then the processing is turned to a step S340. Note that the step S330 corresponds to an example of the list determination processing.

In the step S340, the CPU 44 sets the flag F to "1" to indicate that the operation mode is the weight measuring mode. Then, the processing is turned to a step S350.

In the step S350, the CPU 44 sets the operation mode to the weight measuring mode. Then, this routine is ended to turn the processing to an aftermentioned step S400 in the flow of FIG. 7. Note that the step S350 corresponds to an example of the first mode switch processing and the third mode switch processing.

On the other hand, in a step S360, the CPU 44 carries out an inquiry processing to inquire at the external server 50.

<Inquiry Processing for Inquiring at the External Server>

Figure 10:
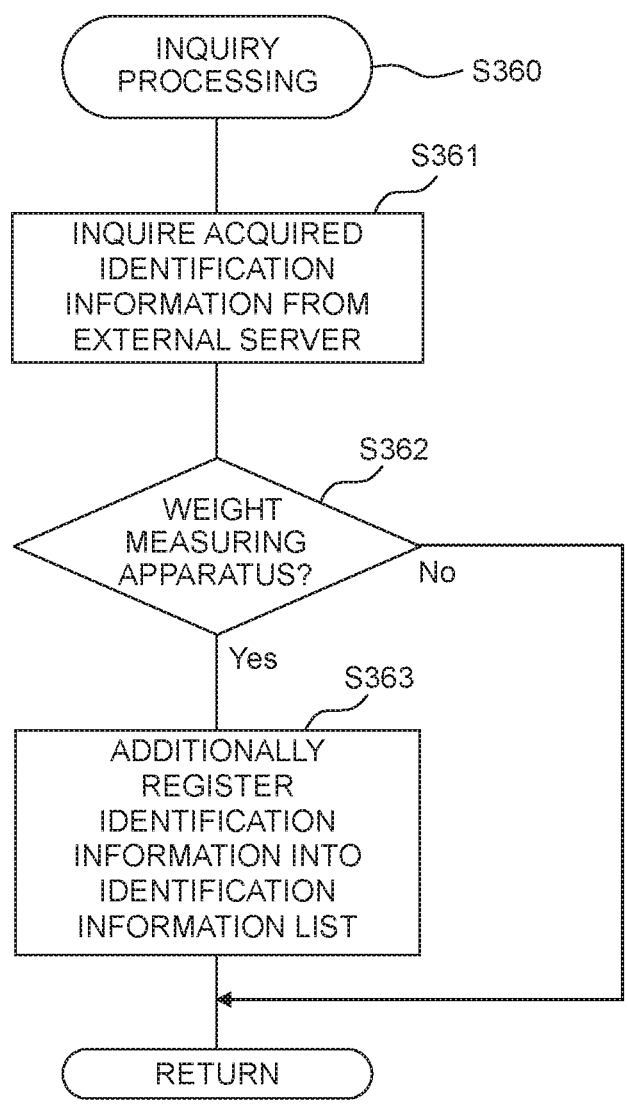
FIG. 10 is a flow chart depicting a detailed procedure of an inquiry processing to an external server.

FIG. 10 depicts a detailed procedure of the step S360. In FIG. 10, first, in a step S361, the CPU 44 sends to the mobile terminal 30 a request for inquiry about the identification information for an external device acquired in the step S320. By virtue of this, the inquiry at the external server 50 is made about whether or not the identification information is referred to the weight measuring apparatus 200. Note that the step S361 corresponds to an example of the inquiry processing.

On this occasion, in the large capacity storage device 56 provided in the external server 50, there is stored a weight measuring apparatus list (not depicted) where the identification information for various weight measuring apparatuses already publicly known is recorded in advance in the same manner as the identification information list 47A in the EEPROM 47. The external server 50 acquires the identification information related to the above inquiry request from the mobile terminal 30, determines whether or not the acquired identification information is included in the weight measuring apparatus list, and sends an answer according to the determination result to the mobile terminal 30.

In a step S362, the CPU 44 acquires the answer sent from the mobile terminal 30 and, based on the answer, determines whether or not the connected external device is the weight measuring apparatus 200. If the answer shows that the external device is not included in the weight measuring apparatus list in the external server 50 (S362: No), then the present routine is ended and the processing is turned to a step S370 in the flow of FIG. 8 described earlier on. If the answer shows that the device is included in the weight measuring apparatus list in the external server 50 (S362: Yes), then the processing is turned to a step S363.

In the step S363, the CPU 44 newly adds and registers the identification information to the identification information list 47A of the flash memory 47. Then, this routine is ended and the processing is turned to the abovementioned step S370 in the flow of FIG. 8. Note that the step S363 corresponds to an example of the second additional registration processing.

<Second External Device Connecting Confirmation Processing>

Returning to FIG. 8, in the step S370, the CPU 44 determines whether or not the identification information for the connected external device is referred to the weight measuring apparatus 200, based on the answer sent from the mobile terminal 30 in the same manner as in the step S362 in FIG. 10. If the identification information for the connected external device is referred to the weight measuring apparatus 200 (S370: Yes), then the processing is turned to the aforementioned step S340. Thereafter, the same procedure is repeated. If the identification information for the connected external device is not referred to the weight measuring apparatus 200 (S370: No), then this routine is ended and the processing is turned to the aforementioned step S400 in the flow of FIG. 7.

<Second Main Flow>

Returning to FIG. 7, in the step S400, the CPU 44 carries out a disconnection confirmation processing for the external device.

<Device Disconnection Confirmation Processing>

Figure 11:
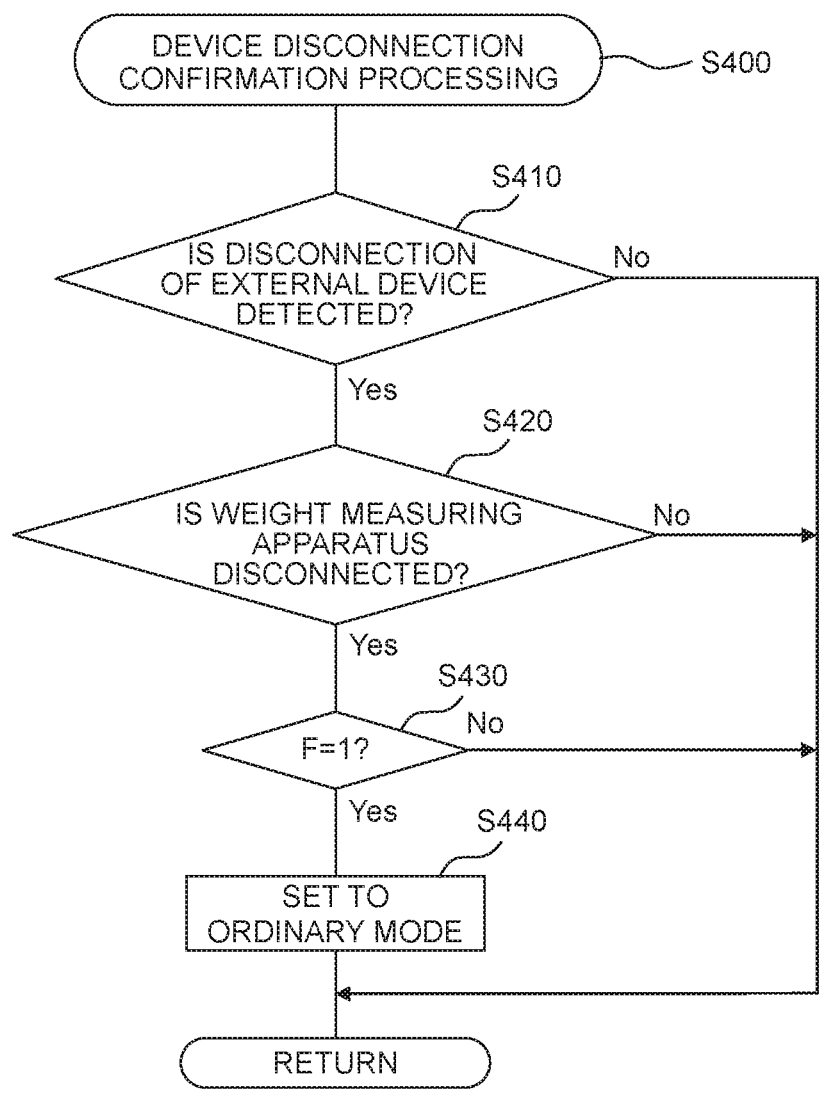
FIG. 11 is a flow chart depicting a detailed procedure of a disconnecting confirmation processing for the external device.

FIG. 11 depicts a detailed procedure of the disconnection confirmation processing for the external device in the step S400.

In FIG. 11, first, in a step S410, the CPU 44 determines whether or not the previously connected external device is disconnected, that is, detects whether or not the external device is disconnected, by a publicly known method. If the external device is not disconnected (S410: No), then this routine is ended and the processing is turned to a step S500 in the FIG. 7. On the other hand, for example, if the external device is detected as disconnected with the USB cable 159 being unplugged or the like (S410: Yes), then the processing is turned to a step S420.

In the step S420, the CPU 44 determines whether or not the external device, which was determined in the step S410 as disconnected, is the weight measuring apparatus 200. If it is not the weight measuring apparatus 200 (S420: No), then this routine is ended and the processing is turned to a step S500 in FIG. 7. If it is the weight measuring apparatus 200 (S420: Yes), then the processing is turned to a step S430. Note that the step S410 and the step S420 correspond to an example of the disconnecting determination processing.

In the step S430, the CPU 44 determines whether or not the value of the flag F is "1". If the value of the flag F is "0" (S430: No), then this routine is ended and the processing is turned to the step S500 in FIG. 7. If the value of the flag F is "1" (S430: Yes), then the processing is turned to a step S440.

In the step S440, the CPU 44 sets the operation mode to the aforementioned ordinary mode. Then, this routine is ended and the processing is turned to the step S500 in FIG. 7. Note that the step S440 corresponds to an example of the sixth mode switch processing.

<Third Main Flow>

Returning to FIG. 7, in the step S500, the CPU 44 carries out a registration instruction confirmation processing for the registration as a weight measuring apparatus.

<Registration Instruction Confirmation Processing for the Weight Measuring Apparatus>

Figure 12:
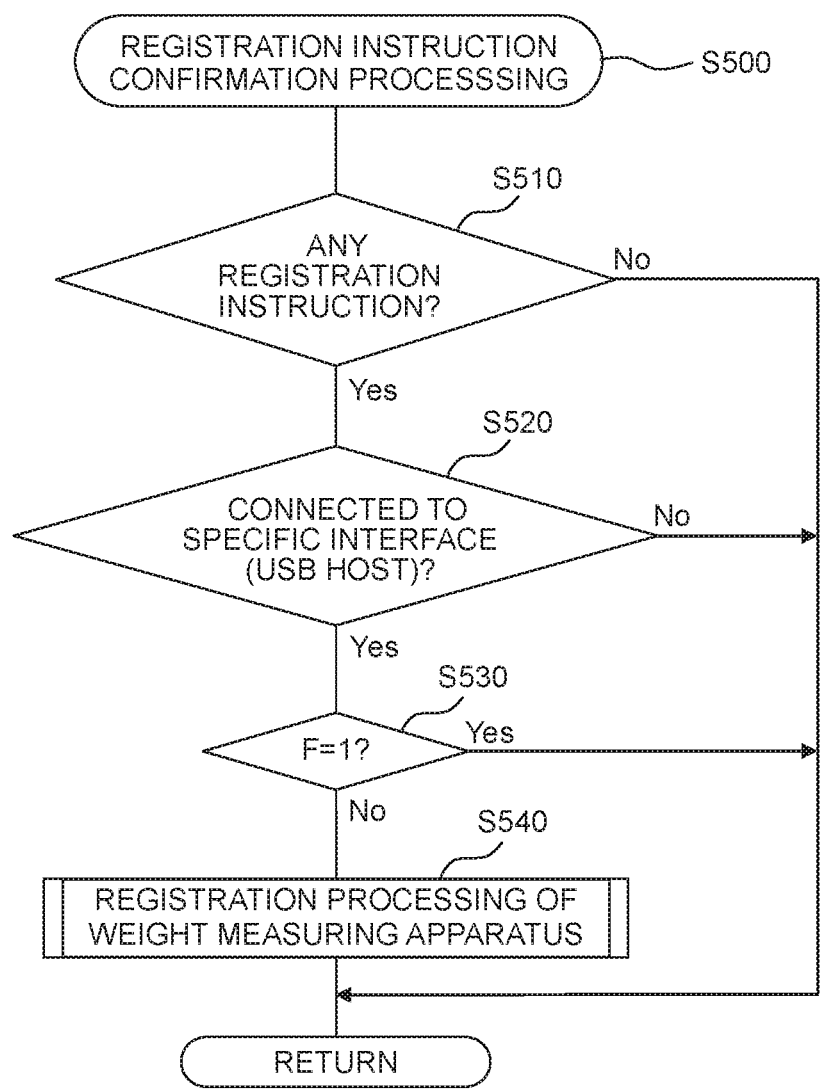
FIG. 12 is a flow chart depicting a detailed procedure of a registration instruction confirmation processing for the external device.

FIG. 12 depicts a detailed procedure of the registration instruction confirmation processing for the registration as a weight measuring apparatus in the step S500.

In FIG. 12, first, in a step S510, the CPU 44 determines whether or not a registration instruction is accepted for registering the external device connected currently to the printing label preparing apparatus 100 as the weight measuring apparatus 200. Note that the registration instruction is carried out by the user's appropriate operation on the key input part 4. If the registration instruction is not accepted (S510: No), then the processing is returned to the step S200 in FIG. 7 to repeat the same procedure. If the registration instruction is accepted (S510: Yes), then the processing is turned to a step S520. Note that as will be described later on, the operation mode for the registration as the weight measuring apparatus 200 is set as the weight measuring mode (see an aftermentioned step S560). Therefore, the operation for the registration instruction corresponds to an example of the mode switch operation. The step S510 corresponds to an example of the mode switch acceptance processing.

In the step S520, the CPU 44 determines whether or not the external device instructed for the registration (to be registered as the weight measuring apparatus 200) in the step S510 is connected to the interface for USB communication 43H (corresponding to an example of the specific interface of this embodiment as described earlier on). If it is not connected to the interface for USB communication 43H (S520: No), then the processing is turned to the step S200 in FIG. 7 to repeat the same procedure. If it is connected to the interface for USB communication 43H (S520: Yes), then the processing is turned to a step S530.

In the step S530, the CPU 44 determines whether or not the value of the flag F is "1". If the value of the flag F is "1" (S530: Yes), then the processing is turned to the step S200 in FIG. 7 to repeat the same procedure. If the value of the flag F is "0" (S530: No), then the processing is turned to a step S540.

In the step S540, the CPU 44 carries out a registration processing for the weight measuring apparatus 200.

<Registration Processing for the Weight Measuring Apparatus>

Figure 13:
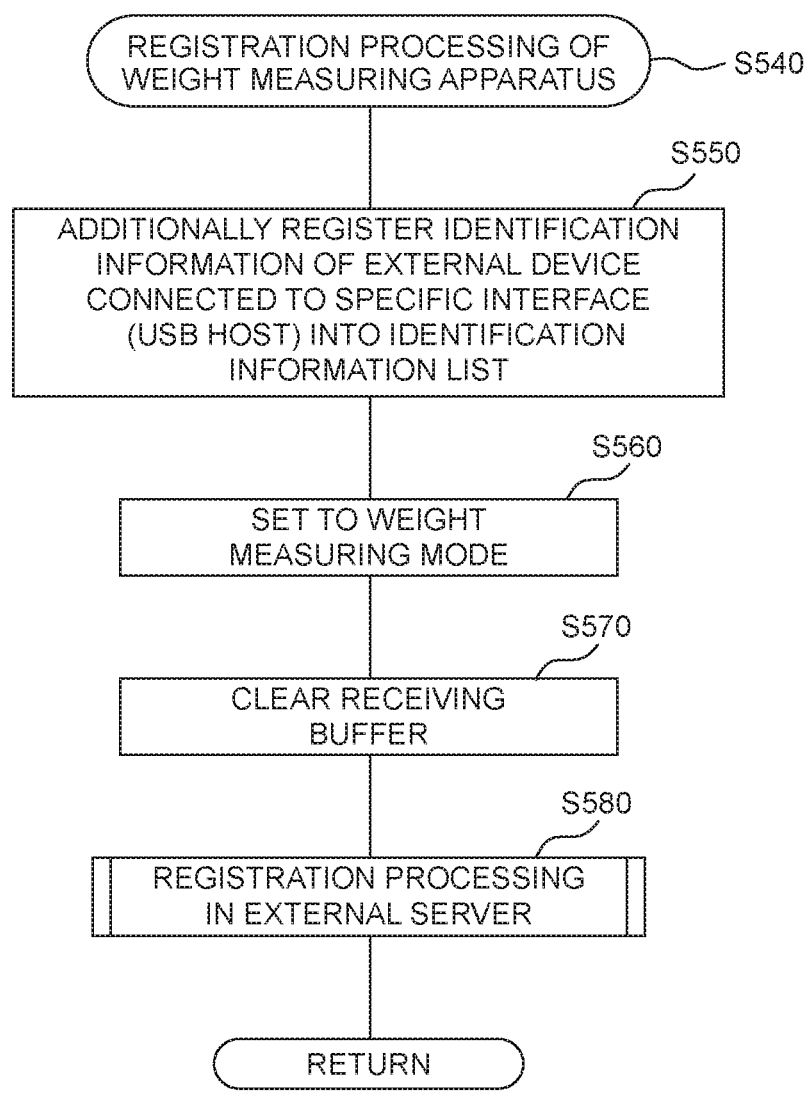
FIG. 13 is a flow chart depicting a detailed procedure of a registration processing for the weight measuring apparatus.

FIG. 13 depicts a detailed procedure of the registration processing in the step S540.

In FIG. 13, first, in a step S550, the CPU 44 additionally registers to the identification information list 47A of the flash memory 47 the identification information for the external device connected to the interface for USB communication 43H at that time (acquired in the step S320 in FIG. 8, for example). Note that the step S550 corresponds to an example of the first additional registration processing and the third additional registration processing.

Then, in a step S560, the CPU 44 sets the weight measuring mode as the operation mode. Note that the step S560 corresponds to an example of the second mode switch processing and the fourth mode switch processing.

Then, in a step S570, the CPU 44 clears the data kept in the receiving buffer 48A at that time (practically a deletion processing). Note that the processing carried out in the step S570 corresponds to an example of the data clearance processing.

Then, in a step S580, the CPU 44 carries out a registration processing to the external server for registering the identification information to the external server 50.

<Registration Processing to the External Server>

Figure 14:
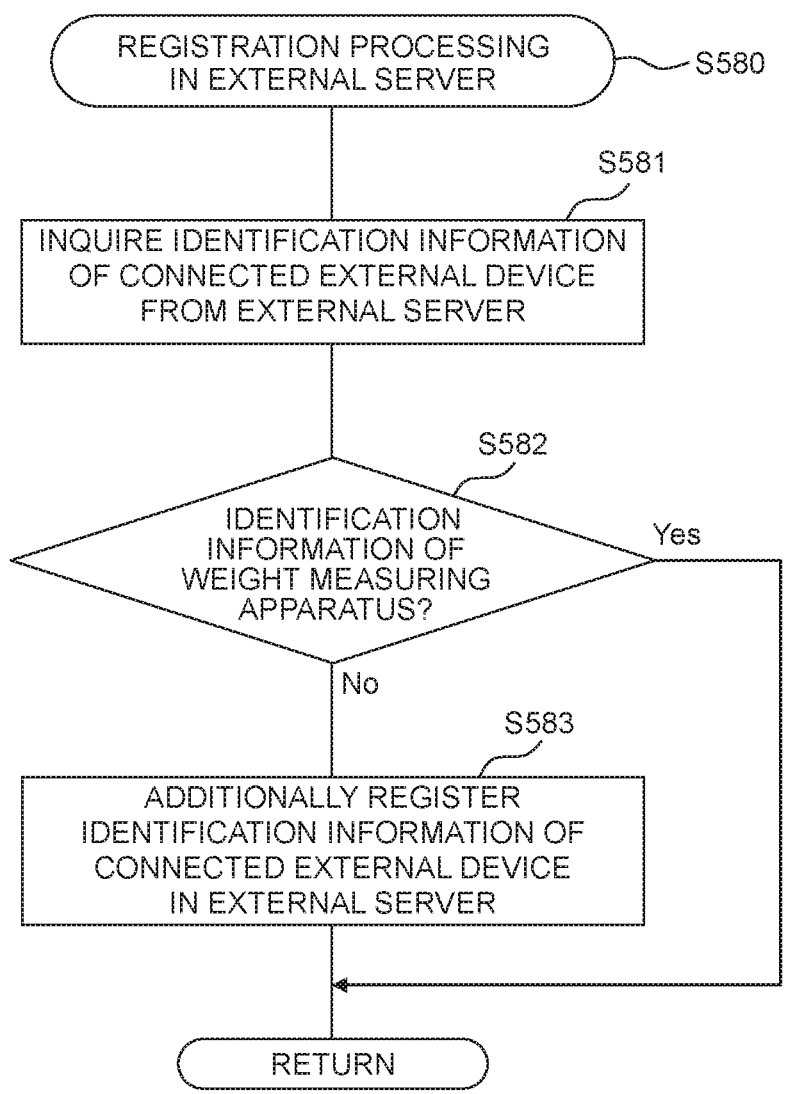
FIG. 14 is a flow chart depicting a detailed procedure of a registration processing into the external server.

FIG. 14 depicts a detailed procedure of the registration processing to the external server in the step S580.

In FIG. 14, first, in a step S581, the CPU 44 sends, in the same manner as in the step S361 in FIG. 10, to the mobile terminal 30 an inquiry request for the identification information for the connected external device (acquired in the step S320 in FIG. 8, for example). By virtue of this, the inquiry at the external server 50 is made about whether or not the identification information is referred to the weight measuring apparatus 200. On this occasion, in the same manner as already described, the external server 50 acquires the identification information related to the above inquiry request from the mobile terminal 30, determines whether or not the acquired identification information is included in the weight measuring apparatus list, and sends an answer according to the determination result to the mobile terminal 30.

Then, in a step S582, in the same manner as in the aforementioned step S362, the CPU 44 acquires the answer sent from the mobile terminal 30 and, based on the answer, determines whether or not the connected external device is the weight measuring apparatus 200. If the answer shows that the device is included in the weight measuring apparatus list in the external server 50 (S582: Yes), then the present routine and the routine in FIG. 12 are ended and the processing is returned to the step S200 in FIG. 7 to repeat the same procedure. If the answer shows that the external device is not included in the weight measuring apparatus list in the external server 50 (S582: No), then the processing is turned to a step S583.

In the step S583, the CPU 44 additionally registers the identification information for the external device to the external server 50. That is, it sends to the mobile terminal 30 the additional registration request for newly adding the identification information to the weight measuring apparatus list in the external server 50. That identification information is further sent from the mobile terminal 30 to the external server 50, and newly added to and registered in the weight measuring apparatus list. Then, this routine and the routines in FIGS. 12 and 13 are ended, and the processing is returned to the step S200 in FIG. 7 to repeat the same procedure. Note that the step S583 corresponds to an example of the additional request processing.

<Fourth Main Flow>

Returning to FIG. 7, in the step S600, the CPU 44 determines whether or not the data determined as received in the step S200 is received (inputted) via the interface for USB communication 43H (corresponding to an example of the specific interface in this embodiment as described earlier on). If the data is received from another interface than the interface for USB communication 43H (S600: No), then the processing is turned to an aftermentioned step S1000. If the data is received from the interface for USB communication 43H (S600: Yes), then the processing is turned to a step S700.

In the step S700, the CPU 44 carries out a confirmation processing for a reception interval.

<Confirmation Processing for Reception Interval>

Figure 15:
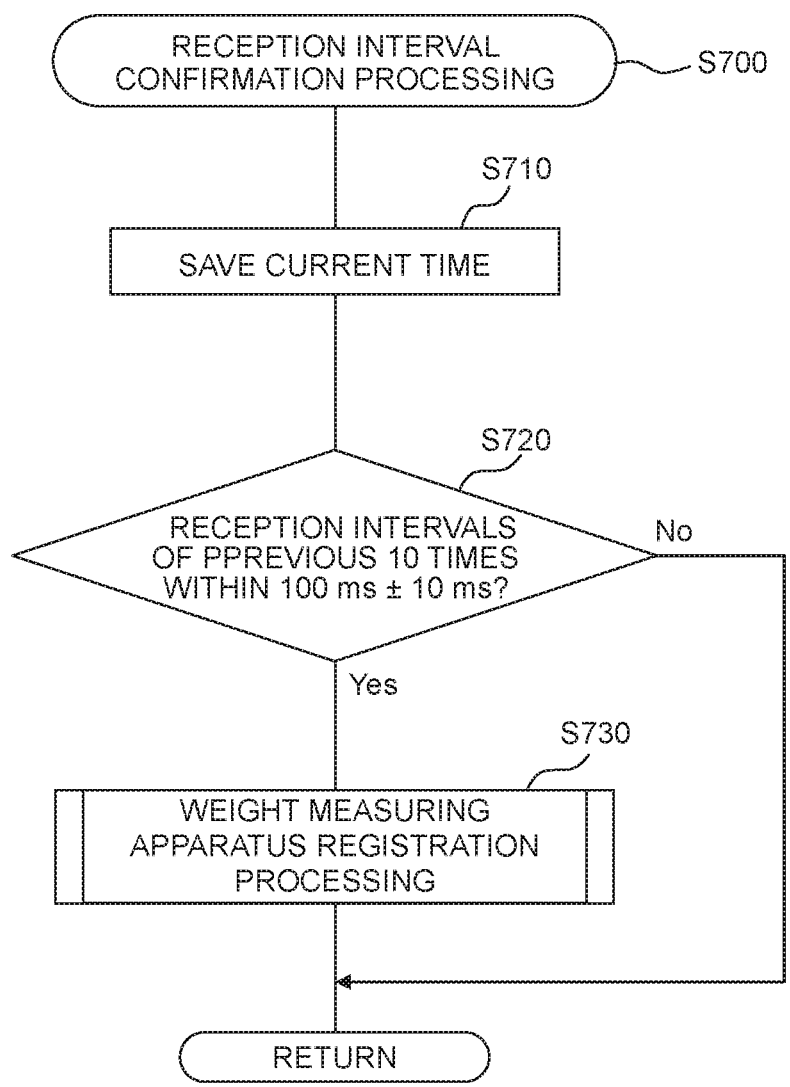
FIG. 15 is a flow chart depicting a detailed procedure of a confirmation processing for a reception interval time for the external device.

FIG. 15 depicts a detailed procedure of the confirmation processing for the reception interval in the step S700.

In FIG. 15, first, in a step S710, the CPU 44 saves the current time at that moment into an appropriate place (the RAM 48 or the like, for example).

Then, in a step S720, the CPU 44 determines whether or not each reception interval lies within a predetermined range (for example, 100 ms±10 ms) if data are received a number of times from the connected external device. If any one of the reception intervals exceeds the range of 100 ms±10 ms (S720: No), then the external device is regarded as not the weight measuring apparatus 200. Then, this routine is ended and the processing is turned to a step S800 in FIG. 7. If all of the reception intervals lie within the range of 100 ms±10 ms (S720: Yes), then the external device is regarded as the weight measuring apparatus 200. Then, the processing is turned to a step S730. Note that the step S720 corresponds to an example of the interval determination processing.

The processing of the step S730 is the same manner as that of the step S540 (see the step S550 to the step S580 in FIG. 13), performing an additional registration of the identification information for the external device connected to the interface for USB communication 43H to the identification information list 47A. Then, this routine is ended and the processing is turned to the step S800 in FIG. 7. Note that if any reception interval exceeds the range of 100 ms±10 ms, then the step S560 (see FIG. 13) is not carried out during the registration processing for the weight measuring apparatus in the step S730, such that the result of the operation mode being not the weight measuring mode corresponds to an example of the fifth mode switch processing.

<Fifth Main Flow>

Returning to FIG. 7, in the step S800, the CPU 44 determines whether or not the operation mode is the weight measuring mode. If it is the ordinary mode (S800: No), then the processing is turned to the aftermentioned step S1000. If it is the weight measuring mode (S800: Yes), then the processing is turned to a step S900.

In the step S900, the CPU 44 outputs and transfers the data received from the external device (the weight measuring apparatus 200 in this case) via the interface for USB communication 43H as described earlier on, via the interface designated in advance for the weight measuring mode (the interface for wireless communication 45 for carrying out communication with the mobile terminal 30 in this embodiment). By virtue of this, the received data is sent to the second antenna 33 of the mobile terminal 30 by way of the wireless communication via the interface for wireless communication 45. Then, the processing is returned to the step S200 to repeat the same procedure.

On the other hand, in the step S1000, the CPU 44 inputs the data received from the external device in the aforementioned manner to the receiving buffer 48A. Then, the processing is turned to a step S1010.

In the step S1010, the CPU 44 carries out a command analysis/execution processing and then the processing is returned to the step S200 to repeat the same procedure.

<Command Analysis/Execution Processing>

Figure 16:
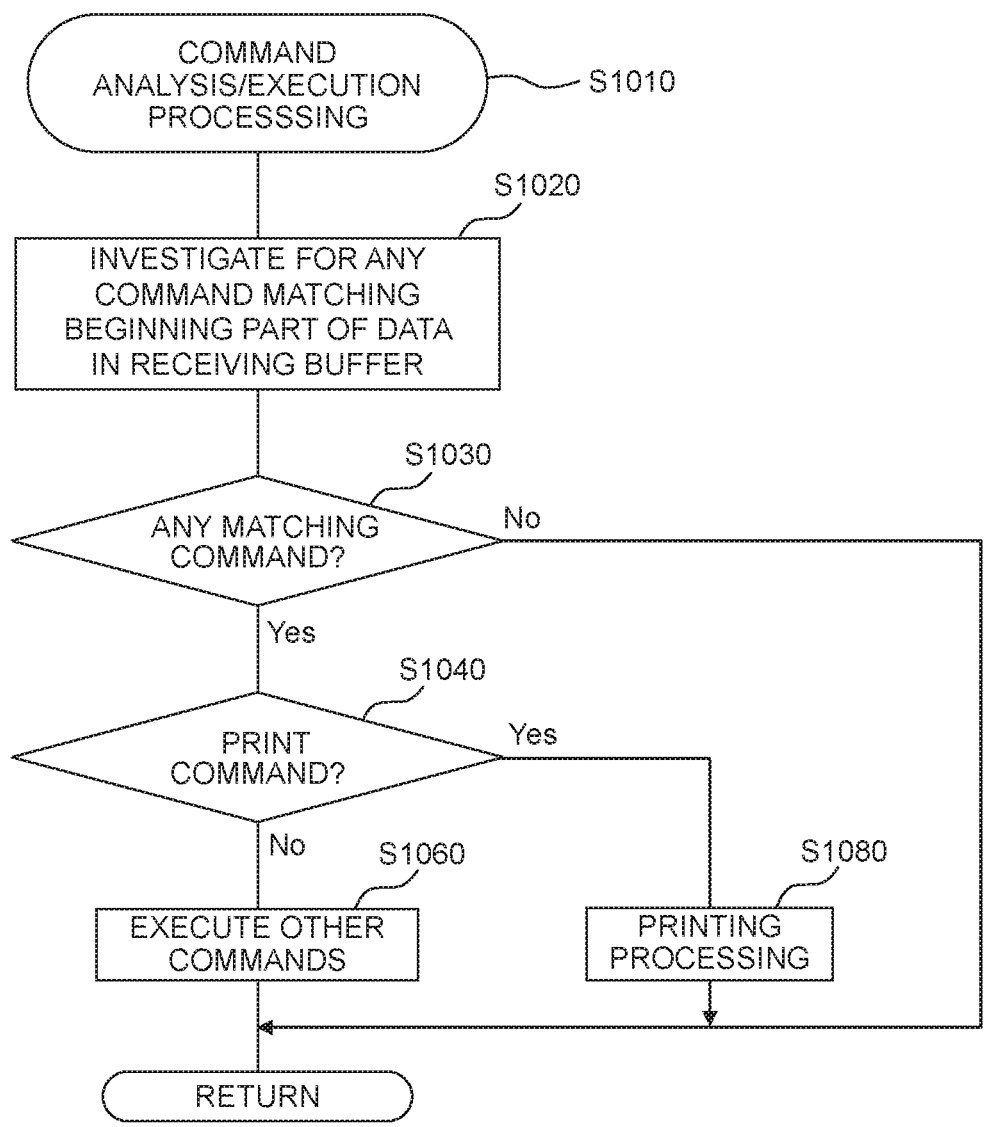
FIG. 16 is a flow chart depicting a detailed procedure of a command analysis/execution processing.

FIG. 16 depicts a detailed procedure of the step S1010. In FIG. 16, first, in a step S1020, the CPU 44 detects the data inputted to the receiving buffer 48A in the step S1000, and investigates whether or not there is a command matching a beginning part of the data.

Then, in a step S1030, the CPU 44 determines whether or not, as a result of the processing of the step S1020, the command exists to match the beginning part of the data. If the matching command does not exist (S1030: No), then this routine is ended and the processing is returned to the step S200 in FIG. 7 to repeat the same procedure. If the command matching the beginning part of the data exists (S1030: Yes), then the processing is turned to a step S1040.

In the step S1040, the CPU 44 determines whether or not the command determined as matching in the step S1030 is a print command. If the command determined as matching in the step S1030 is determined as a print command (S1040: Yes), then the processing is turned to a step S1080.

In the step S1080, the CPU 44 controls the platen roller 26 and the thermal head 25 via the platen roller drive circuit 209 and the head drive circuit 205, to carry out a printing processing corresponding to the print command. By virtue of this, for example, the printing label preparing apparatus 100 receives, from the mobile terminal 30, the print command based on the measuring data which is inputted from the weight measuring apparatus 200, and outputted and transferred to the mobile terminal 30 (see the step S900). If the print data is developed in the receiving buffer 48A (see the step S1000), then the printing corresponding to the print data is carried out on the tape for label-print 20A, to prepare the printed label L. Then, this routine is ended and the processing is turned to the step S200 in FIG. 7 to repeat the same procedure.

On the other hand, in the step S1040, if the command determined as matching in the step S1030 is determined as not the print command (S1040: No), then the processing is turned to a step S1060.

In the step S1060, the CPU 44 executes other commands than the print command. Then, this routine is ended and the processing is turned to the step S200 in FIG. 7 to repeat the same procedure.

<Flow for Mobile Terminal>

Figure 17:
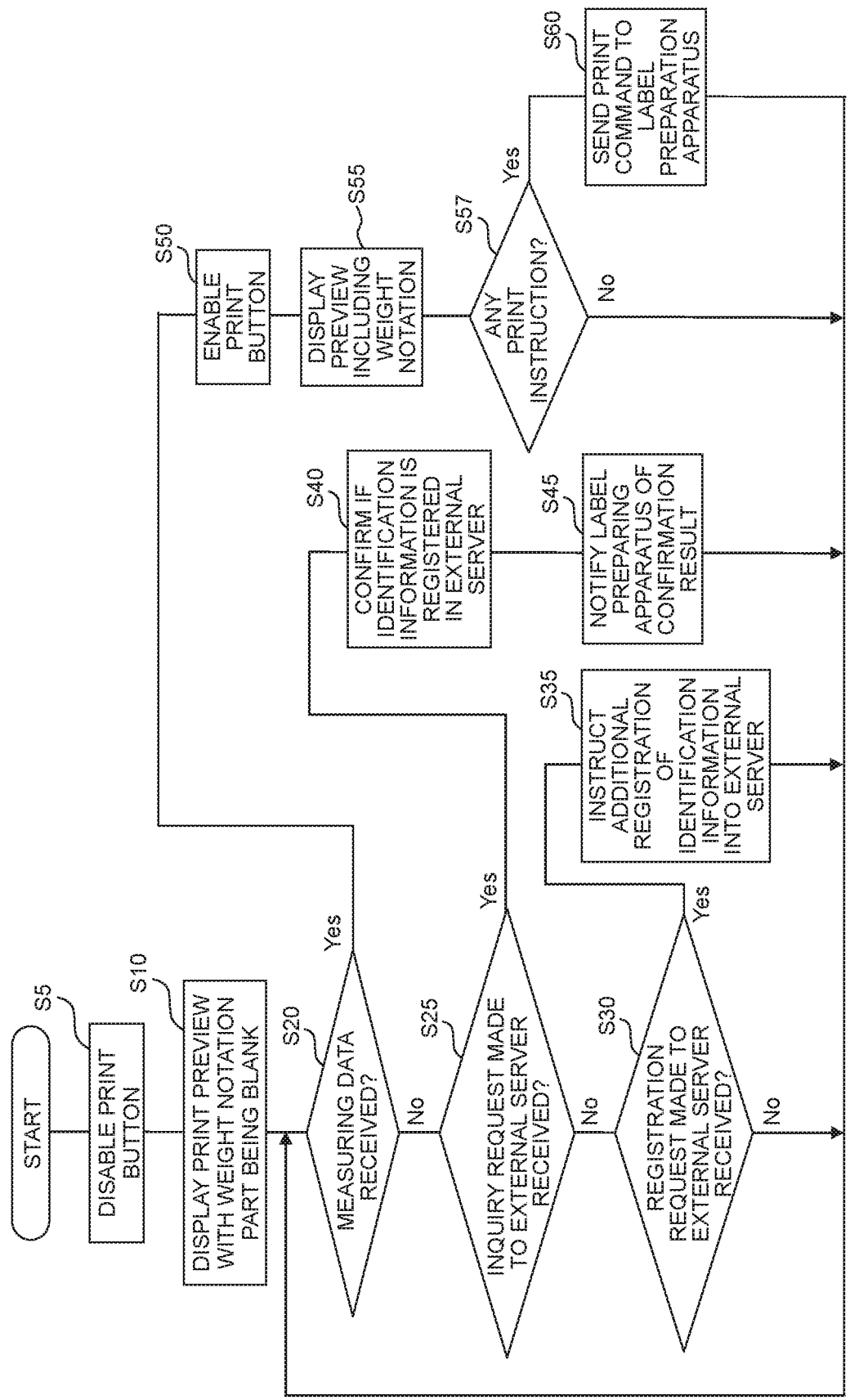
FIG. 17 is a flow chart depicting a processing procedure carried out by the CPU of the mobile terminal.

The flow chart of FIG. 17 is used to explain the cooperative processing carried out by the CPU 35 of the mobile terminal 30 when the processing explained by using FIGS. 4A and 4B to FIG. 16 is carried out in the printing label preparing apparatus 100. Note that this flow chart takes such an exemplary case for explanation that the weight measuring apparatus 200 is operating in the weight measuring mode.

In FIG. 17, first, in a step S5, the CPU 35 disables the print button of the operation part 37 (for example, makes it gray out so as to disable the operation per se or the like). Note that the print button serves for sending the print command to the printing label preparing apparatus 100.

Then, in a step S10, the CPU 35 displays on the display 38 a preview screen displaying printing contents prepared beforehand for carrying out the printing in the printing label preparing apparatus 100. Note that in the preview screen, there is a blank area for later displaying the weight measuring result from the weight measuring apparatus 200.

Then in a step S20, the CPU 35 determines whether or not the measuring data is received from the printing label preparing apparatus 100 (see the aforementioned step S900) based on the measuring result from the weight measuring apparatus 200. If the measuring data is not received (S20: No), then the processing is turned to an aftermentioned step S25. If the measuring data is received (S20: Yes), then the processing is turned to a step S50.

In the step S50, the CPU 35 enables the print button which was disabled in the step S5 (for example, ceases the gray-out so as to enable the operation or the like). Then, the processing is turned to a step S55.

In the step S55, the CPU 35 displays the printing contents with the weight description on the abovementioned blank area in the preview displayed in the step S10, based on the measuring data received in the step S20.

Then, the processing is turned to a step S57 where the CPU 35 determines whether or not the print button is pressed (whether or not there is a print instruction). If there is no print instruction (S57: No), then the processing is returned to the step S20 to repeat the same procedure. If there is a print instruction (S57: Yes), then the processing is turned to a step S60.

In the step S60, the CPU 35 generates a print command including the print data corresponding to the preview contents, and sends the print command to the printing label preparing apparatus 100 (see the aforementioned step S1040 and step S1080 in FIG. 16). Then, the processing is returned to the step S20 to repeat the same procedure.

On the other hand, if the measuring data is determined in the step S20 as not yet received (S20: No), then in the step S25, the CPU 35 determines whether or not the inquiry request to the external server 50 about the identification information is received (see the step S361 in FIG. 10 and the step S581 in FIG. 14). If the inquiry request is received (S25: Yes), then the processing is turned to the step S40. Note that the step S25 corresponds to an example of the first request reception procedure.

In the step S40, as described earlier on, the CPU 35 inquires of (confirms with) the external server 50 about whether or not the identification information related to the inquiry request is included in the weight measuring apparatus list 56. Note that the step S40 corresponds to an example of the inquiry procedure.

Then, in a step S45, the CPU 35 notifies the printing label preparing apparatus 100 of the confirmation result of the step S40. That is, according to the inquiry result of the step S40, the CPU 35 sends to the printing label preparing apparatus 100 the answer to whether or not the abovementioned identification information is included in the weight measuring apparatus list 56 (see the step S362 in FIG. 10 and the step S582 in FIG. 14). Then, the processing is returned to the step S20 to repeat the same procedure. Note that the step S45 corresponds to an example of the answer transmission procedure.

On the other hand, in the step S25, if the inquiry request is not received (S25: No), then the processing is turned to a step S30. In the step S30, the CPU 35 determines whether or not the additional registration request for the identification information to the external server 50 (see the step S583 in FIG. 14) is received. If the additional registration request is not received (S30: No), then the processing is returned to the step S20 to repeat the same procedure. If the additional registration request is received (S30: Yes), then the processing is turned to the step S35. Note that the step S30 corresponds to an example of the second request reception procedure.

In the step S35, as described earlier on, the CPU 35 sends the identification information related to the additional registration request to the external server 50, and instructs the same to additionally register the identification information to the weight measuring apparatus list 56. Then, the processing is returned to the step S20 to repeat the same procedure. Note that the step S35 corresponds to an example of the additional registration instruction procedure.

<Effects of the Embodiment>

As explained hereinabove, the present embodiment obtains the following effects.

That is, in the printing label preparing apparatus 100 according to this embodiment, two operation modes are provided: the weight measuring mode and the ordinary mode. These two operation modes are switched appropriately for execution. If any external device is connected to the printing label preparing apparatus 100, then based on the identification information for the connected external device, the external device is identified (see the step S320). Then, the identification information for identification is determined as whether or not included in the identification information list 47A. Then, if it is included in the identification information list 47A, then the operation mode is switched to the weight measuring mode (see the step S350).

As described above, in the printing label preparing apparatus 100, even if any external device is connected, it is still possible to automatically switch the operation mode to the weight measuring mode as long as the identification information is registered in the identification information list 47A. By virtue of this, differently from conventional configurations used to integrally link the printing label preparing apparatus 100 as a dedicated device with a weight measuring apparatus, it is possible to use the printing label preparing apparatus 100 for general purposes as an ordinary printer, too, other than for the weight measuring apparatus 200 to carry out weight measuring. Especially, in the weight measuring mode, without developing the received data in the receiving buffer 48A (see FIG. 4B), it is possible to reliably prevent inappropriate operation due to a mistaken command analysis of the data in the receiving buffer 48A. Further, in this embodiment, it is not necessary to carry out any tangled setting and the like for switching the modes. Therefore, because it is sufficient to simply connect an eternal device to the printing label preparing apparatus 100 only, the labor burden on the user will not increase.

Further, in this embodiment, after determining whether or not the external device is connected (see the step S310), the external device is identified on the basis of the identification information for the connected external device if the external device is determined as connected (see the step S320). In this manner, with the external device connected, the identification information obtained at the time of connection is determined as whether or not included in the identification information list 47A, such that it is possible to switch the operation modes.

Further, in this embodiment, if there is a registration instruction from the key input part 4, then the operation mode is regarded as the weight measuring mode (see the step S510 and the step S560). By virtue of this, even if the identification information for the connected external device is not included in the identification information list 47A, it is still possible to switch the operation mode to the weight measuring mode by user's manual operation.

Further, in this embodiment, if there is a registration instruction from the key input part 4, then it is possible to newly and additionally register the identification information to the identification information list 47A (see the step S550). By virtue of this, even if the identification information for the connected external device is not included in the identification information list 47A, it is still possible to newly and additionally register the identification information to the identification information list 47A by user's manual operation. As a result, thereafter, if the external device is connected to the printing label preparing apparatus 100, then it is possible to automatically switch the operation mode to the weight measuring mode.

Further, in this embodiment, the additional request is sent to the mobile terminal 30 for newly adding the identification information to the weight measuring apparatus list 56 of the external server 50 (see the step S583). By virtue of this, by user's manual operation, it is possible to newly add the identification information to the weight measuring apparatus list 56 of the external server 50. As a result, thereafter, it is possible to automatically switch the operation mode to the weight measuring mode in the printing label preparing apparatus 100, when there is an inquiry at the external server 50 about the identification information (whether or not included in the weight measuring apparatus list 56) for the external device from another printing label preparing apparatus 100 connected with that external device, for example.

Further, in this embodiment, an inquiry request is sent to the mobile terminal 30 about whether or not the identification information is included in the weight measuring apparatus list 56 of the external server 50 (see the step S361). By virtue of this, even if the identification information for the connected external device is not included in the identification information list 47A, it is still possible to automatically switch the operation mode to the weight measuring mode when the identification information is included in the weight measuring apparatus list 56 of the external server 50.

Further, in this embodiment, if such an answer is received from the mobile terminal 30 as made by the external server 50 to the inquiry request, then the identification information is newly registered to the identification information list 47A (see the step S363). By virtue of this, even if the identification information for the connected external device is not included in the identification information list 47A, it is still possible to newly add the identification information to the identification information list 47A when the identification information is included in the weight measuring apparatus list 56 of the external server 50. As a result, thereafter, if the external device is connected to the printing label preparing apparatus 100, then it is possible to automatically switch the operation mode to the weight measuring mode (without inquiring at the external server 50).

Further, in this embodiment, the weight measuring apparatus 200 is configured to send the weight measuring data of a measuring object repetitively at a predetermined frequency. Hence, in this embodiment, that characteristic is used to determine whether or not the intervals of receiving data a number of times lie within a predetermined range when the data are received from the external device multiple times (see the step S720). Then, if they lie within the predetermined range, then the external device is regarded as the weight measuring apparatus 200 such that the operation mode is switched to the weight measuring mode (see the step S730 and the step S560). By virtue of this, if the connected external device is the weight measuring apparatus 200, then the operation mode is automatically switched to the weight measuring mode without needing user's manual operation, inquiry at the external server 50, or the like.

Further, in this embodiment, if the intervals of receiving the data a number of times lie within the predetermined range, then the identification information is newly registered to the identification information list 47A. By virtue of this, if the connected external device is the weight measuring apparatus 200, then the identification information for the connected external device can be newly added to the identification information list 47A without needing user's manual operation, inquiry at the external server 50, or the like. As a result, thereafter, if the external device is connected to the printing label preparing apparatus 100, then it is possible to automatically switch the operation mode to the weight measuring mode.

Further, in this embodiment, if the intervals of receiving the data a number of times from the external device do not lie within the predetermined range, then the external device is regarded as not the weight measuring apparatus 200, thereby switching the operation mode to the ordinary mode. By virtue of this, if the connected external device is not the weight measuring apparatus 200, then it is possible to automatically switch the operation mode to the weight measuring mode without needing user's manual operation, inquiry at the external server 50, or the like.

Further, in this embodiment, with the printing label preparing apparatus 100 in the weight measuring mode as the operation mode, at the time when the external device is disconnected, the operation mode is switched to the ordinary mode. By virtue of this, it is possible to reliably use the printing label preparing apparatus 100 for an ordinary printing purpose when the connection with the weight measuring apparatus 200 is ceased.

Further, in this embodiment, corresponding to the aforementioned switching from the ordinary mode to the weight measuring mode, it is possible to clear the data kept in the receiving buffer 48A (the step S570). By virtue of this, if the connected external device is identified as the weight measuring apparatus 200, then it is possible, for example, to reliably delete the unnecessary data developed in the receiving buffer 48A in the ordinary mode prior to the identification. As a result, it is possible to increase the free space in the receiving buffer 48A. By virtue of this, it is possible, for example, to acquire data and/or commands from other external devices than the weight measuring apparatus 200 via another interface than the interface for USB communication 43H used for information communication with the weight measuring apparatus 200, so as to develop and process the same.

Note that the above description was made with an exemplary case where the weight measuring apparatus 200 sent the measuring data to the printing label preparing apparatus 100 repetitively at a predetermined frequency. However, without being limited to that, the weight measuring apparatus 200 may be configured to send the measuring data to the printing label preparing apparatus 100 accordingly when receiving a transmission request (an appropriate command, for example) from the printing label preparing apparatus 100, (except for the case of carrying out the method depicted in the step S700 in FIG. 7 and FIG. 15).

Further, in the above description, the arrow in FIG. 3 illustrates an exemplary signal flow but does not limit the direction of the signal flow thereto.

Further, the sequence depicted in FIG. 5 and the flow charts depicted in FIG. 7, FIG. 8, and FIGS. 10 to 17 do not limit the present teaching to the procedures depicted therein. Hence, addition or deletion of procedures and/or modification of sequential orders may be applied without departing from the true spirit and technical thoughts of the teaching.

Further, other than the above description, the methods according to the above embodiment and modified embodiments may be used in appropriate combinations.

Furthermore, although without exemplifications, various changes and modifications are applicable to the present teaching for carrying out the teaching without departing from the true spirit and scope of the teaching.

What is claimed is:

1. A printer configured to communicate with an operation terminal and a weight measuring apparatus configured to transmit a measuring data of weight of a measuring object, the printer comprising:
    a receiving buffer configured to store data;
    a memory in which an identification information list for the weight measuring apparatus is stored; and
    a controller,
    wherein the printer has, as an operation mode, a weight measuring mode for transferring the data received via a specific interface, to which the weight measuring apparatus is connected, to the operation terminal, and an ordinary mode for executing a command analysis after developing, in the receiving buffer, the data received via all interfaces including the specific interface, and
    wherein the controller is configured to execute:
    an identification processing of identifying an external device based on identification information of the external device connected to the printer;
    a list determination processing of determining whether the identification information used for the identification processing is included in the identification information list stored in the memory; and
    a first mode switch processing of letting the operation mode be the weight measuring mode based on determining that the identification information is included in the identification information list in the list determination processing.

2. The printer according to claim 1,
    wherein the controller is further configured to execute a connecting determination processing of determining connection of the external device, and
    in the identification processing, the controller is configured to identify the external device based on the identification information of the external device connected to the printer, based on determining that the external device is connected in the connecting determination processing.

3. The printer according to claim 2, further comprising an operation part,
    wherein the controller is further configured to execute:
    a mode switch acceptance processing of accepting a mode switch operation via the operation part, based on determining that the external device is connected in the connecting determination processing and that the identification information is not included in the identification information list in the list determination processing; and
    a second mode switch processing of letting the operation mode be the weight measuring mode based on the mode switch operation accepted in the mode switch acceptance processing.

4. The printer according to claim 3, wherein the controller is further configured to execute a first additional registration processing of additionally registering the identification information used in the identification processing into the identification information list stored in the memory, based on the mode switch operation accepted in the mode switch acceptance processing.

5. The printer according to claim 4, wherein the controller is further configured to execute an additional request processing of transmitting, to the operation terminal, an additional request for adding the identification information used in the identification processing to a weight measuring apparatus list of an external server depending on the first additional registration processing.

6. The printer according to claim 1,
    wherein the controller is further configured to execute:
    a connecting determination processing of determining connection of the external device;
    an inquiry processing of transmitting, to the operation terminal, an inquiry request for inquiring of an external server whether the identification information used in the identification processing is included in a weight measuring apparatus list in the external server, based on determining that the external device is connected in the connecting determination processing and that the identification information is not included in the identification information list in the list determination processing; and a third mode switch processing of letting the operation mode be the weight measuring mode, based on receiving an answer, from the operation terminal, that the identification information is included in the weight measuring apparatus list in the external server, in response to the inquiry request transmitted in the inquiry processing.

7. The printer according to claim 6, wherein the controller is further configured to execute a second additional registration processing of newly registering the identification information used in the identification processing into the identification information list stored in the memory, based on receiving the answer from the operation terminal.

8. The printer according to claim 1,
wherein the weight measuring apparatus is configured to transmit the measuring data repeatedly at a predetermined interval, and
the controller is further configured to execute:
a data determination processing of determining whether data is received from the external device;
an interval determination processing of determining whether intervals of receiving the data from the external device are within a predetermined range, based on determining that the data is received in the data determination processing; and
a fourth mode switch processing of letting the operation mode be the weight measuring mode based on determining that the intervals are within the predetermined range in the interval determination processing.

9. The printer according to claim 8, wherein the controller is further configured to execute a third additional registration processing of newly registering the identification information used in the identification processing into the identification information list stored in the memory, based on determining that the intervals are within the predetermined range in the interval determination processing.

10. The printer according to claim 8, wherein the controller is further configured to execute a fifth mode switch processing of letting the operation mode be the ordinary mode based on determining that the intervals are out of the predetermined range in the interval determination processing.

11. The printer according to claim 2,
wherein the controller is further configured to execute:
a disconnecting determination processing of determining whether the external device is disconnected in a state that the operation mode is in the weight measuring mode; and
a sixth mode switch processing of letting the operation mode be the ordinary mode based on determining that the external device is disconnected in the disconnecting determination processing.

12. The printer according to claim 3, wherein the controller is further configured to execute a data clearance processing of clearing the data stored in the receiving buffer in response to executing the first mode switch processing or the second mode switch processing.

13. The printer according to claim 6, wherein the controller is further configured to execute a data clearance processing of clearing the data stored in the receiving buffer in response to executing the third mode switch processing.

14. The printer according to claim 10, wherein the controller is further configured to execute a data clearance processing of clearing the data stored in the receiving buffer in response to executing the fourth mode switch processing or the fifth mode switch processing.

15. The printer according to claim 11, wherein the controller is further configured to execute a data clearance processing of clearing the data stored in the receiving buffer in response to executing the sixth mode switch processing.

16. A non-transitory computer-readable medium storing programs executable by a processor of an operation terminal which is connectable to a printer, the printer being connectable to a weight measuring apparatus which is configured to output weight data of a measurement object, the printer having a weight measuring mode in which received data is transmitted to the operation terminal and a normal mode in which command analysis is executed with respect to the received data, the programs, when executed by the processor, causing the operation terminal to:

receive, from the printer, an inquiry request about whether identification information of an external device connected to the printer is included in a weight measuring apparatus list in an external server;

inquire whether the identification information is included in the weight measuring apparatus list by transmitting, to the external server, the identification information related to the inquiry request received; and transmit an answer, to the printer, that the identification information is included or not included in the weight measuring apparatus list, based on the result of the inquiry.

17. The medium according to claim 16, wherein the programs further cause the operation terminal to:

receive, from the printer, an addition request for adding the identification information of the external device to the weight measuring apparatus list; and transmit, to the external server, the identification information related to the addition request received and instruct the external server to additionally register the identification information into the weight measuring apparatus list.

* * * * *